(12) United States Patent
Liu et al.

(10) Patent No.: US 9,124,136 B1
(45) Date of Patent: Sep. 1, 2015

(54) SYSTEM AND METHOD FOR SINGLE-PHASE, SINGLE-STAGE GRID-INTERACTIVE INVERTER

(75) Inventors: Liming Liu, Tallahassee, FL (US); Hui Li, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 647 days.

(21) Appl. No.: 13/493,528

(22) Filed: Jun. 11, 2012

Related U.S. Application Data

(60) Provisional application No. 61/495,458, filed on Jun. 10, 2011.

(51) Int. Cl.
*H02J 1/00* (2006.01)
*H02J 3/00* (2006.01)
*H02J 3/38* (2006.01)

(52) U.S. Cl.
CPC ........................ *H02J 3/38* (2013.01)

(58) Field of Classification Search
CPC ............ H02J 3/383; H02J 1/00; H02J 1/102; H02J 3/385; H02J 3/38; H02J 1/10; H02J 3/00; H02J 3/386; H02J 3/46; H02J 3/36; H02J 1/12; H02J 3/18; H02J 4/00; H02J 7/35

USPC ........................................................ 307/82
See application file for complete search history.

(56) References Cited

U.S. PATENT DOCUMENTS

| | | | | |
|---|---|---|---|---|
| 4,641,232 A | * | 2/1987 | Pitel | 363/71 |
| 5,642,275 A | * | 6/1997 | Peng et al. | 363/137 |
| 6,005,788 A | * | 12/1999 | Lipo et al. | 363/71 |
| 7,642,666 B2 | * | 1/2010 | Ichinose et al. | 290/44 |
| 2008/0280175 A1 | * | 11/2008 | Gurunathan et al. | 429/23 |
| 2012/0290145 A1 | * | 11/2012 | Joshi et al. | 700/298 |

* cited by examiner

*Primary Examiner* — Jared Fureman
*Assistant Examiner* — Esayas Yeshaw
(74) *Attorney, Agent, or Firm* — Molly L. Sauter; Smith & Hopen, P.A.

(57) ABSTRACT

The present invention provides for the integration of distributed renewable energy sources/storages utilizing a cascaded DC-AC inverter, thereby eliminating the need for a DC-DC converter. The ability to segment the energy sources and energy storages improves the maintenance capability and system reliability of the distributed generation system, as well as achieve wide range reactive power compensation. In the absence of a DC-DC converter, single stage energy conversion can be achieved to enhance energy conversion efficiency.

15 Claims, 23 Drawing Sheets

Duty cycle saturation condition with different k

Over modulation condition with different k

P_grid=0.5u, Q_grid=1.0pu, k=0.4

P_grid=0.5u, Q_grid=1.0pu, k=0.7

Real Power Allocation

Reactive Power Allocation

TABLE I: SYSTEM PARAMETERS

| | Parameters | Symbol | Value |
|---|---|---|---|
| DG system | DC link Voltage | $V_{dc}$ | 140V (1.0 pu) |
| | Capacitor Voltage | $V_{cap1}, V_{cap2}$ | 70V (0.5 pu) |
| | Capacitor size | $C_{cap1}, C_{cap2}$ | 40 mF |
| | Filter Inductor | $L_1, L_2$ | 0.8mH (0.103 pu) |
| | Filter Capacitor | $C_f$ | 12uF (0.013 pu) |
| Grid | Rated real power | $P\_{grid}$ | 3.5 kW (1.0 pu) |
| | Rated reactive power | $Q\_{grid}$ | 3.5kVAR (1.0 pu) |
| | Rated RNS phase voltage | $V_g$ | 120V (1.0 pu) |

*FIG. 20*

SYSTEM AND METHOD FOR SINGLE-PHASE, SINGLE-STAGE GRID-INTERACTIVE INVERTER

CROSS-REFERENCE TO RELATED APPLICATIONS

This application claims priority to currently co-pending U.S. Provisional Patent Application No. 61/495,458, entitled "System and Method for Single-Phase, Single-Stage Grid-Interactive Converter", filed on Jun. 10, 2011, and incorporated herein by reference.

STATEMENT OF GOVERNMENT INTEREST

This invention was made with Government support under DE-FC26-07NT43221 awarded by the Department of Energy. The Government has certain rights in the invention.

BACKGROUND OF THE INVENTION

Distributed generation, also commonly referred to as on-site generation, dispersed generation, embedded generation, decentralized generation, decentralized energy or distributed energy, generates electricity from multiple small energy sources. The distributed power generation system comprising the multiple small energy sources is interconnected with the same transmission grid as the larger central power generation stations. Various technical and economic issues arise in the integration of these distributed generation resources into the grid, such as power quality, voltage stability, presence of harmonics and reliability.

Grid-interactive converters/inverters with energy storage system (ESS) for distributed power generation (DG) systems have been gaining popularity in response to the requirements for energy source/storage diversity, environmental concerns, desired cost reduction, improvements in efficiency, etc. One main challenge in DG systems is determining how to improve the efficiency, reduce the cost and improve the power quality of the current DG systems known in the art.

Traditionally, AC link systems and DC link systems have been employed in distributed generation systems known in the art. In the DC link system, as shown in FIG. 1(a), multiple DC-DC converters are used to interface different energy sources/storages. In order to achieve the DC-AC energy conversion, the DC-DC converters are usually connected to one inverter with a common DC bus. As a result, the DC link system configuration still requires DC-DC and DC-AC conversion stages. Limited switching frequency on the common inverter results in the requirement for a large AC filter and large electrolyte capacitors, which seriously impacts the overall system efficiency, cost and lifetime of the inverter. Furthermore, in order to achieve desired wide range reactive power compensation, the DC capacitor and inverter must be oversized to generate the possible AC output voltage.

As shown with reference to FIG. 1, in the traditional AC link system, multiple DC-DC converters and DC-AC inverters are used to interface different energy sources/storages as shown in FIG. 1(b). Though the real and reactive power can be distributed flexibly between different energy sources/storages utilizing the AC link system, the system requires multiple energy conversion stages. Moreover, due to the common AC bus used in the AC link system, the power flow control must to be carefully designed, particularly to address the needs of weak power systems. In an AC link system, the overall system cost will increase due to the need for multiple converters and inverters and large passive components. In addition, the transformer utilized in both the DC link and the AC link systems described above will increase the overall system size and reduce the power density.

Accordingly, what is needed in the art is a distributed generation (DG) system that exhibits high power density, high power efficiency, high power quality and high system reliability.

SUMMARY OF INVENTION

The present invention provides for the integration of distributed renewable energy sources/storages utilizing a cascaded DC-AC inverter, thereby eliminating the need for a DC-DC converter. The ability to segment the energy sources/storages will improve the maintenance capability and system reliability. In the absence of a DC-DC converter, single stage energy conversion can be achieved.

A system in accordance with the present invention integrates scalable cascaded architecture, an advanced Discrete Fourier Transform (DFT) Phase Locked Loop (PLL) method, a hybrid modulation technique and a sophisticated power allocation strategy to achieve wide range reactive power compensation, improve the system power density, and enhance energy conversion efficiency.

In a specific embodiment of the invention, an inverter for a distributed generation system is provided. The inverter may include a main DC to AC inverter to be coupled to the at least one distributed energy source, the main DC to AC inverter to provide a real power of the inverter and to provide a first portion of a reactive power of the inverter and at least one auxiliary DC to AC inverter in cascade with the main DC to AC inverter, each of the at least one auxiliary DC to AC inverters to be coupled to one of each of the at least one energy storages and each of the at least one auxiliary DC to AC inverters to provide a remaining portion of the reactive power of the inverter, wherein the sum of the first portion of the reactive power from the main inverter and each of the remaining portions of the reactive power from each of the auxiliary inverters equals a total reactive power of the inverter for the distributed generation system.

In a particular embodiment, the main DC to AC inverter and the auxiliary DC to AC inverters may be H-bridge cells.

In an additional embodiment, the main DC to AC inverter may switch at a fundamental frequency and the auxiliary DC to AC inverters may switch at a pulse-width-modulated frequency.

In operation, a method for inverting DC to AC in a distributed generation system, is provided by the present invention. The method may include calculating a reactive power allocation coefficient, providing a real power and a first portion of a reactive power of the inverter from a main DC to AC inverter coupled to the at least one distributed energy source, wherein the first portion of the reactive power is dependent upon the reactive power allocation coefficient and providing a remaining portion of the reactive power of the inverter from each of at least one auxiliary DC to AC inverters coupled in cascade to the main DC to AC inverter and coupled to each of the at least one energy storages, wherein the remaining portion of the reactive power is dependent upon the reactive power allocation coefficient and wherein the sum of the first portion of the reactive power from the main inverter and the remaining portion of the reactive power from each of the auxiliary inverters equals a total reactive power of the inverter.

The present invention can achieve high power efficiency, high power density, high power quality and high system reliability as a result of the single stage energy conversion, transformer-free structure, wide range reactive power compensation, multilevel AC output with equivalent high frequency, possible low frequency for each switching device, and redundant capability. Additionally, the incorporation of the present invention into future smart grid implementations is promising.

BRIEF DESCRIPTION OF THE DRAWINGS

For a fuller understanding of the invention, reference should be made to the following detailed description, taken in connection with the accompanying drawings, in which:

FIG. 20 illustrates Table I showing the system parameters in accordance with an embodiment of the present invention.

DETAILED DESCRIPTION OF THE INVENTION

Figure 1A:
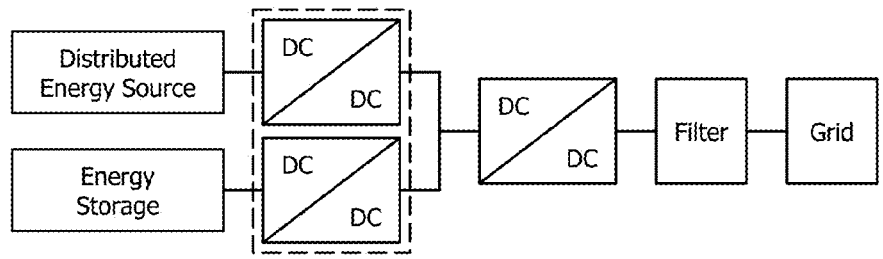
FIG. 1 illustrates the reported grid-connected inverters with ESS: (a) DC link system; and (b) AC link system as is known in the prior art.
Figure 1B:
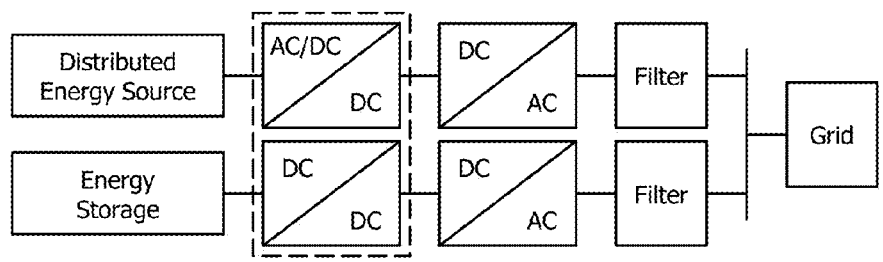
Figure 2:
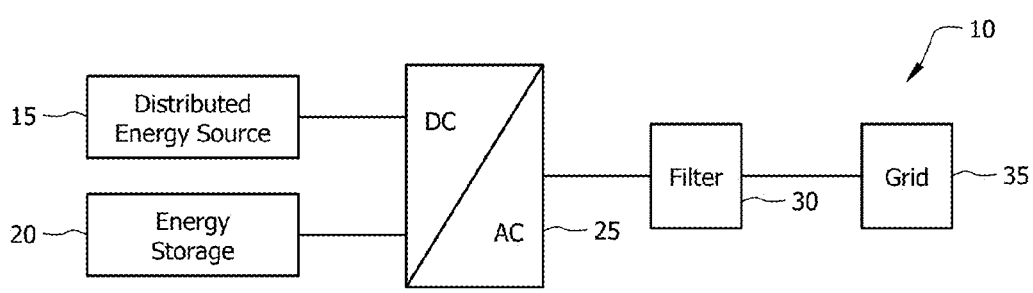
FIG. 2 illustrates a proposed single-stage grid-interactive inverter with ESS in accordance with an embodiment of the present invention.

With reference to FIG. 2, an embodiment of the present invention in a distributed generation (DG) system 10 having distributed energy sources (DES) 15 and energy storages (ES) 20 is illustrated. The output of the distributed energy sources (DES) 15 and the energy storages (ES) 20 are coupled to a cascaded DC-AC inverter 25. The output of the cascaded DC-AC inverter 25 is coupled to the grid 35 through an appropriate filter 30.

Figure 3A:
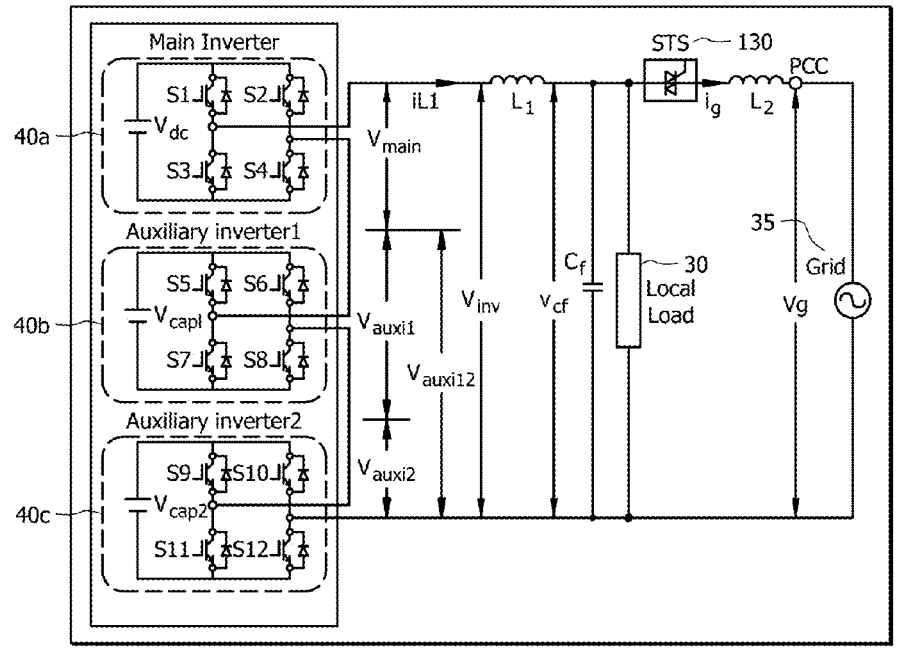
FIG. 3 illustrates a proposed DG System with ES: (a) Topology; and (b) Real and reactive power allocation between DES and ES in accordance with an embodiment of the present invention.

In an exemplary embodiment of the present invention, one distributed energy source (DES) 15 and two energy storages (ES) 20a, 20b are interfaced to the inverter 25 utilizing three cascaded H-bridge cells 40a, 40b, 40c, as illustrated with reference to FIG. 3(a). In the single-phase single-stage DG system 10 in accordance with the exemplary embodiment of the present invention, as shown in FIG. 3(a), the "main" inverter cell 4a is coupled to the distributed energy source 15 and the "auxiliary" inverter cells 4b, 4c are coupled to the energy storages 20a, 20b. In a particular embodiment, the energy storages 20a, 20b may be ultra-capacitors. In additional embodiments, the energy storages 20a, 20b may include battery storage, flow batteries, flywheel, superconducting magnetic energy storage (SMES), compressed air energy storage (CAES), or other various energy storages solutions known in the art. The different energy sources and energy storages integrating with the cascaded inverter can be selected based upon a specific application. In a particular embodiment, the voltage ratio between $V_{dc}$, associated with the main inverter cell 4a, and $V_{cap1}$ and $V_{cap2}$, associated with the auxiliary inverter cells 4b, 4c, may be 2:1:1, respectively. The "main" and "auxiliary" inverters may switch at the fundamental and a pulse-width modulated (PWM) frequency, respectively.

Figure 3B:
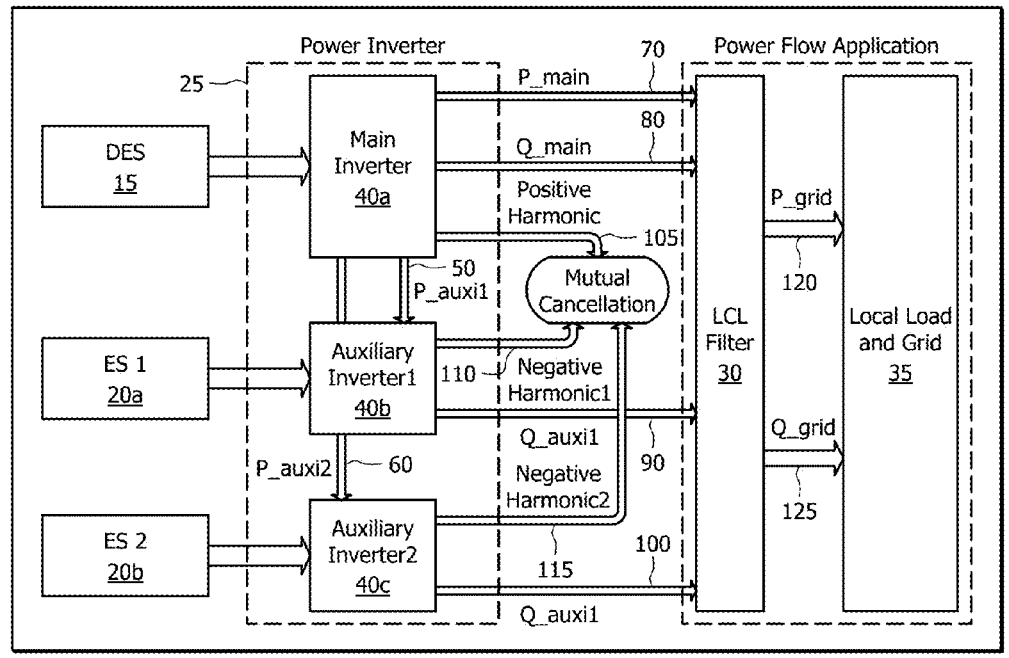

The real and reactive power allocation between the distributed energy sources 15 and the energy storages 20a, 20b is shown with reference to FIG. 3(b). P_grid 120 and Q_grid 125 are representative of the real power P and the reactive power Q delivered to the grid 35. P_main 70 and Q_main 80 represent the real power P and reactive power Q generated from the main inverter cell 40a. Q_auxi1 90 and Q_auxi2 100 represent the reactive power Q from the auxiliary inverter cells 40b, 40c. As such, in the present invention, the main inverter cell 40a provides all of the real power 120 and a portion of the reactive power Q 125 to the grid and the auxiliary inverters 40b, 40c provide the remaining portion of the reactive power 125. P_auxi1 50 and P_auxi2 60 are delivered from the main inverter 4a to the auxiliary inverter cells 4b, 4c to charge the energy storages 20a, 20b during start-up, compensate the for power loss and maintain the energy storages 20a, 20b voltage during grid-connected mode. In addition, the low-order harmonic voltages 105 generated by the main inverter 4a resulting from the fundamental switching frequency are cancelled by the equivalent negative harmonic voltages 110, 115 generated from the auxiliary inverters 4b, 4c. The distributed power generation system 10 is able to operate in both stand-alone mode and grid-connected mode through a static transfer switch (STS) 130.

One advantage of the cascaded inverter structure of the present invention is that the DC voltage of each inverter cell can be reduced. However, the reduced DC voltage will affect the reactive power generation capability. In order to achieve wide range reactive power compensation, it is desired that the reactive power is provided by all the inverter cells instead of a single inverter cell. The desired distribution of the reactive power among the inverter cells 4a, 4b, 4c is based upon a proposed reactive power allocation (RPA) strategy.

Figure 4:
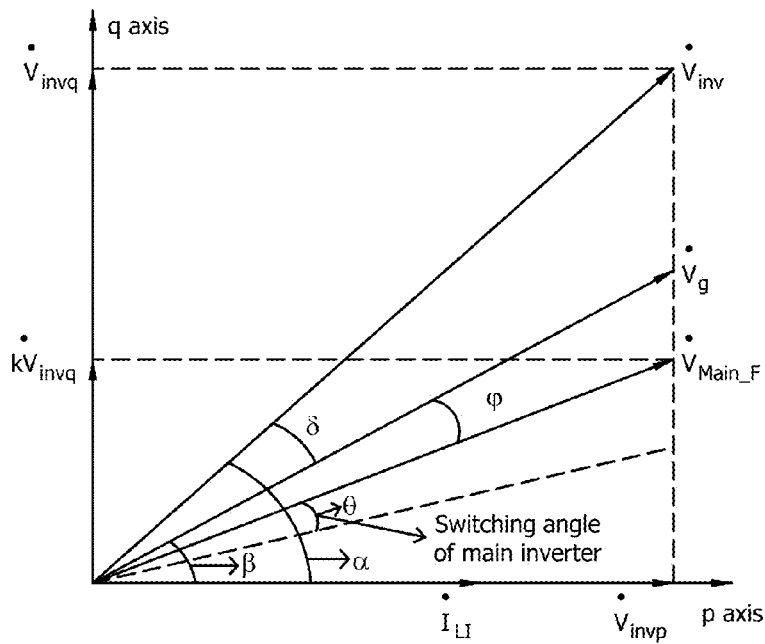
FIG. 4 illustrates the power allocation vector diagram between DES and ES in accordance with an embodiment of the present invention.

A vector diagram is shown in FIG. 4 illustrating the reactive power distribution between the distributed energy source 15 and the energy storages 20a, 20b. The rotation frequency of the pq frame is the system frequency. $\vec{I}_{L1}$, $\vec{V}_{inv}$ and $\vec{V}_g$ and are the vectors of $i_{L1}$, $v_{inv}$, and $v_g$ respectively where the latter can be identified with reference to FIG. 3(a). $\vec{V}_{main\_F}$ is the fundamental component of the main inverter 4a output voltage. $\vec{V}_{invq}$ and $\vec{V}_{invp}$ is the q-axis and p-axis component of $\vec{V}_{inv}$ respectively in the vector diagram. Since the real power is entirely provided by the main inverter 4a, the p-axis component of $\vec{V}_{main\_F}$ is the same as that of $\vec{V}_{inv}$. k is defined as reactive power allocation coefficient (RPAC). α is the phase shift angle between $\vec{V}_{inv}$ and $\vec{I}_{L1}$. β is the angle between $\vec{V}_g$ and $\vec{I}_{L1}$. δ is the phase shift between $\vec{V}_{inv}$ and $\vec{V}_g$. θ is the switching angle of main inverter.

In grid-connected mode, the real and reactive power delivered to the grid 35, as well as grid voltage, are known. The average real and reactive power delivered to the grid 35 can be given by:

$$\begin{cases} P\_grid = \dfrac{V_g V_{inv}}{2\omega L} \sin\delta \\ Q\_grid = \dfrac{V_g}{2\omega L}(V_{inv}\cos\delta - V_g) \end{cases} \quad (1)$$

where $V_g$ is the amplitude of the grid voltage; $V_{inv}$ is the amplitude of the cascaded inverter output voltage; ω is the fundamental frequency; $L=L_1+L_2$ is the total filter inductor. The filter capacitor is neglected.

According to (1), the phase shift between grid voltage and cascaded inverter output voltage can be calculated as:

$$\delta = \tan^{-1}\left(\dfrac{P\_grid \times 2\omega L}{Q\_grid \times 2\omega L + V_g^2}\right) \quad (2)$$

The average real and reactive power delivered to grid can also be represented in (3):

$$\begin{cases} P\_grid = \dfrac{V_g I_{L1}}{2}\cos\beta \\ Q\_grid = \dfrac{V_g I_{L1}}{2}\sin\beta \end{cases} \quad (3)$$

where $I_{L1}$ is the amplitude of the inductor current.

So, the angle between grid voltage and inductor current can be obtained in (4):

$$\beta = \tan^{-1}\left(\dfrac{Q\_grid}{P\_grid}\right) \quad (4)$$

The phase shift between cascaded inverter output voltage and inductor current can be obtained by adding (2) to (4) as:

$$\alpha = \beta + \delta \quad (5)$$

Based on (1), the $V_{inv}$ can be derived in (6):

$$V_{inv} = \sqrt{\left(\dfrac{Q\_grid \times 2\omega L}{V_g} + V_g\right)^2 + \left(\dfrac{P\_grid \times 2\omega L}{V_g}\right)^2} \quad (6)$$

The Fourier series expansion of the quasi-square-wave of main inverter output voltage is given by:

$$v_{main} = \sum_{n=1,3,5,\ldots}^{\infty} \dfrac{4V_{dc}}{n\pi}\cos(n\theta)\sin(n(\omega t - \varphi)) = v_{main\_F} + v_{main\_h} \quad (7)$$

Where φ is phase-shift angle between $\vec{V}_{main\_F}$ and $\vec{V}_g$, $V_{dc}$ is the main inverter dc input voltage, $$v_{main\_F} = \dfrac{4V_{dc}}{\pi}\cos(\theta)\sin(\omega t - \varphi)$$

is the fundamental component of $v_{main}$, $$v_{main\_h} \sum_{n=1,3,5,\ldots}^{\infty} \dfrac{4V_{dc}}{n\pi}\cos(n\theta)\sin(n(\omega t - \varphi))$$

is the harmonic component of $v_{main}$.

According to FIG. 4, the transient fundamental component of the main inverter output voltage can be given as:

$$v_{main\_F} = v_{invp} + kv_{invq} = V_{inv}\cos\alpha\,\sin(\omega t - \beta) + kV_{inv}\sin\alpha\,\cos(\omega t - \beta) \quad (8)$$

$$= V_{inv}\sqrt{(\cos\alpha)^2 + (k\sin\alpha)^2}\,\sin(\omega t - \beta + \gamma)$$

Where, $$\gamma = \arcsin\left(\dfrac{k\sin\alpha}{\sqrt{(\cos\alpha)^2 + (k\sin\alpha)^2}}\right),$$

$$v_{invp} = V_{inv}\cos\alpha\,\sin(\omega t - \beta),\ v_{invq} = V_{inv}\sin\alpha\,\cos(\omega t - \beta)$$

FIG. 4 shows that the selection of θ with respect to the reactive power allocation and θ is derived in (9):

$$\theta = \cos^{-1}\left[\frac{V_{inv}}{V_{dc}} \times \frac{\pi}{4} \times \sqrt{(\cos\alpha)^2 + (k\sin\alpha)^2}\right] \quad (9)$$

where $V_{dc}$ is the main inverter DC input voltage.

Figure 5:
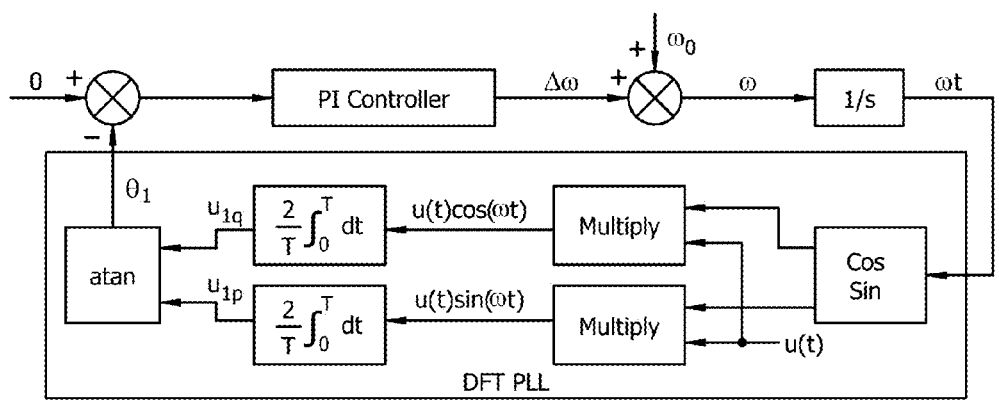
FIG. 5 illustrates the proposed DFT PLL method in accordance with an embodiment of the present invention.
Figure 6A:
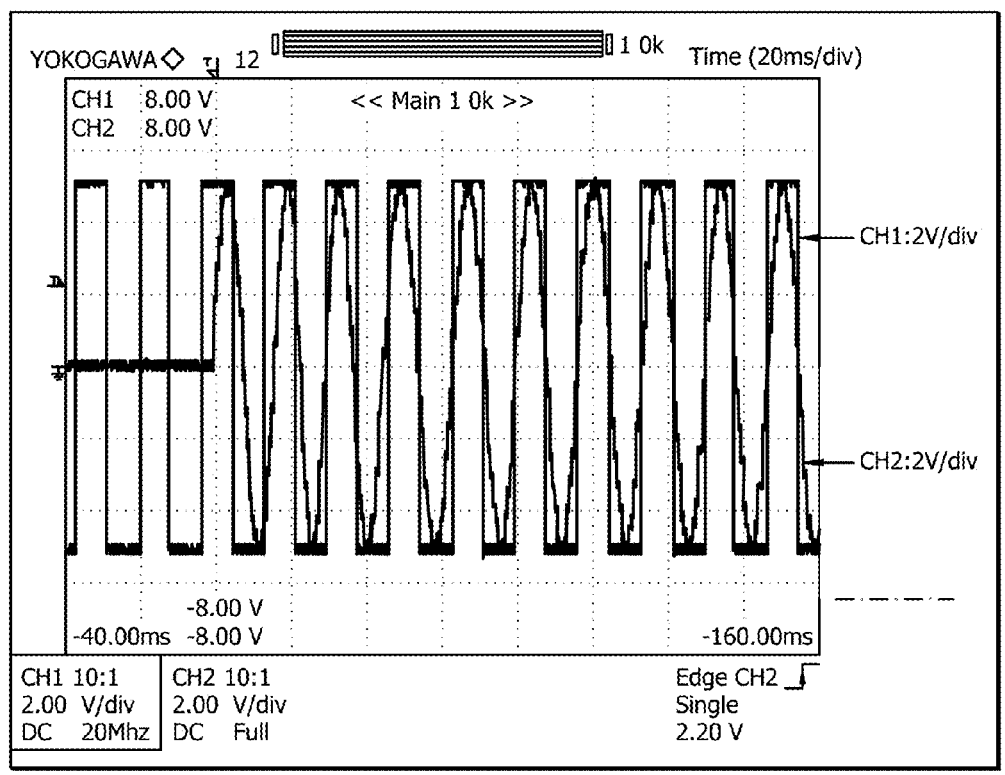
FIG. 6 illustrates the experimental results of DFT PLL, CH1 is input signal and CH2 is output signal: (a) input signal is square wave and output signal is sinusoidal wave, (b) input signal is triangular wave and output signal is sinusoidal wave, (c) the input signal frequency increases from 60 Hz to 70 Hz, (d) the input signal frequency decreases from 60 Hz to 50 Hz, in accordance with an embodiment of the present invention.
Figure 6B:
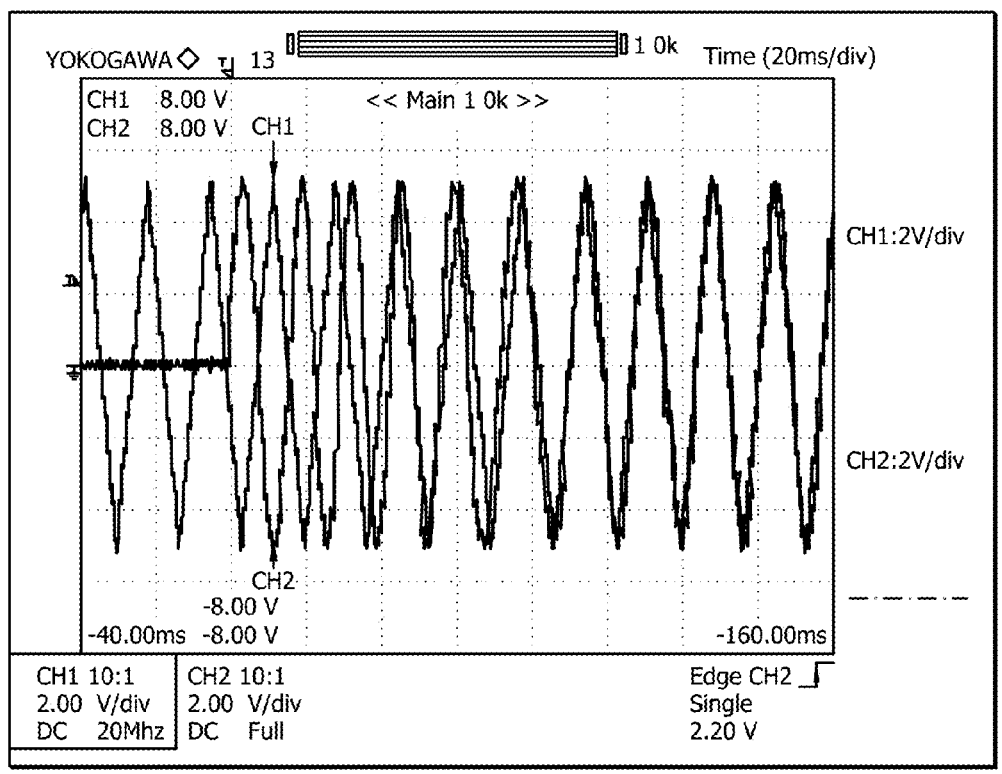
Figure 6C:
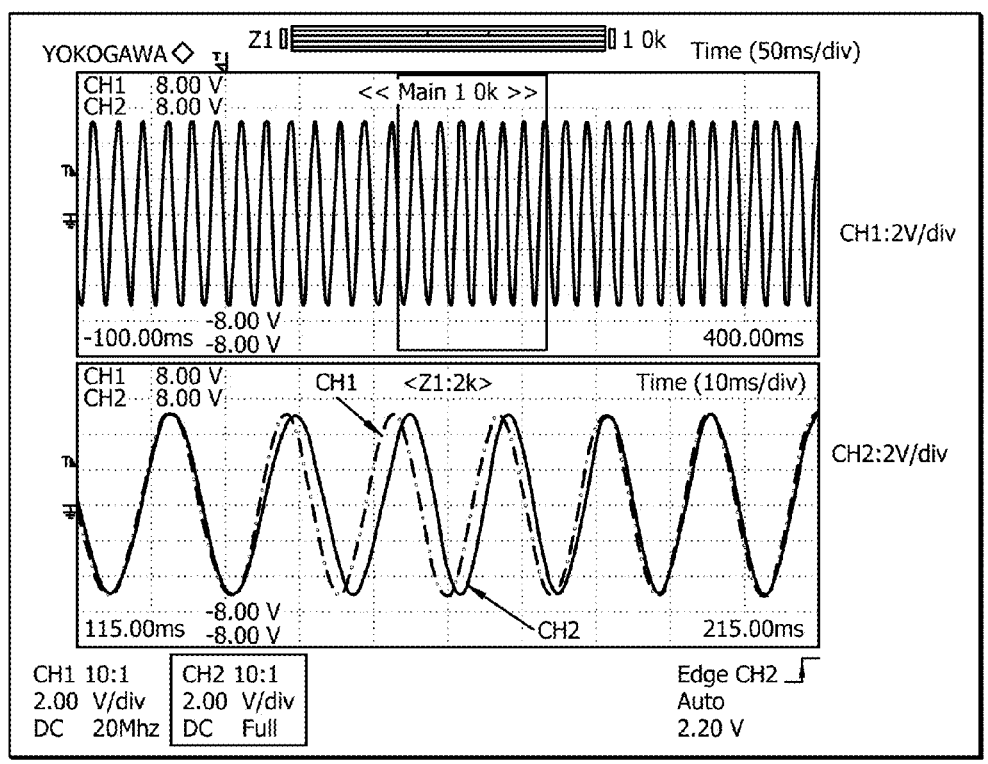
Figure 6D:
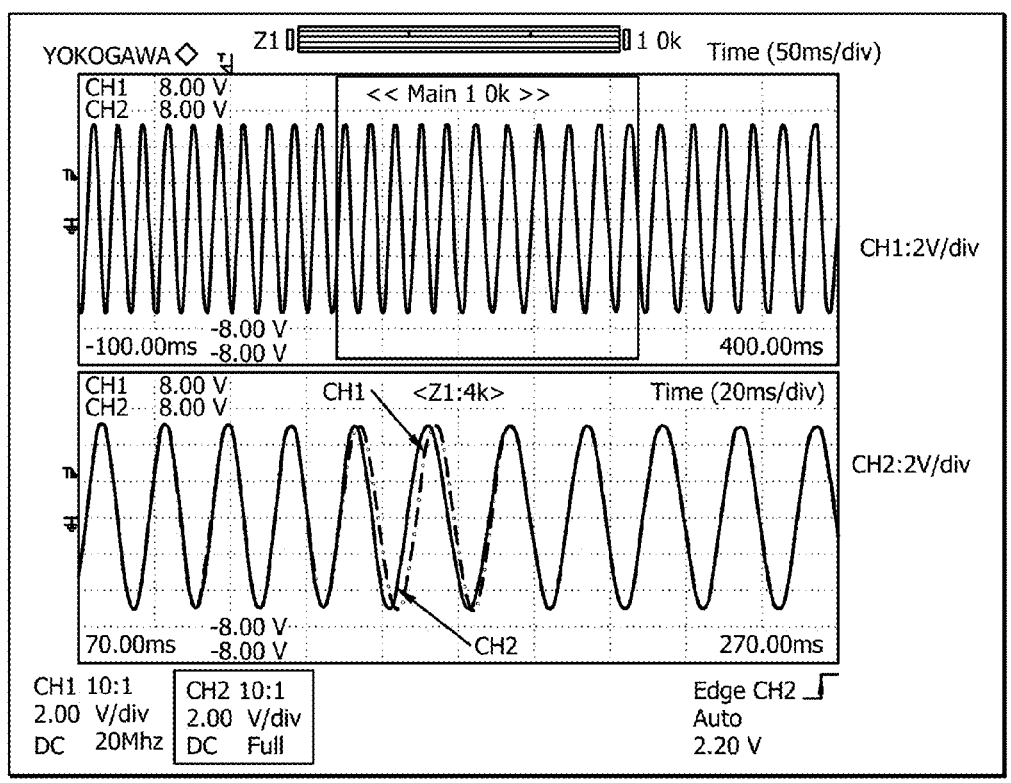

Based on the vector analysis of FIG. 4, extracting the real and reactive components of $v_{inv}$ is essential to establish the desired power allocation. In order to extract the real and reactive components of $v_{inv}$, a Discrete Fourier Transform (DFT) Phase-Locked Loop (PLL) method is proposed, as shown in FIG. 5.

The DFT PLL method of the present invention can extract the phase, frequency and amplitude information from any signal. The DFT PLL method of the present invention is capable of extracting the fundamental component from any input signal without damping. This is in contrast to the prior art in which the harmonic components of the input signal degrades the PLL performance. As such, the proposed DFT PLL method is immune to the degradation effect resulting from the harmonic components. Additionally, in the DFT PLL method of the present invention, the controlled DC component is only related to the angle of the input signal which allows the control system for the PLL to be applicable within a wide range, and moreover the amplitude change of the input signal will not have an impact on the DFT PLL performance. This is in contract to the prior art, in which one DC component is related to amplitude and angle of the input signal and is controlled to be zero and used to achieve the PLL. As such, the proposed DFT PLL method is immune to harmonics and signal amplitude which may affect the PLL performance. As illustrated in FIG. 5, any signal including harmonic components can be expressed as follows:

$$u(t) = u_o + \sum_{k=1}^{\infty}[u_k\sin(k\omega t + \theta_k)] = u_o + \sum_{k=1}^{\infty}[u_{ky}\cos(k\omega t) + u_{kx}\sin(k\omega t)] \quad (10)$$

Where $u_0$ is the dc component; ω is the fundamental frequency, $$u_{kx} = \frac{2}{T}\int_0^T u(t)\sin(k\omega t)\,dt; \quad u_{ky} = \frac{2}{T}\int_0^T u(t)\cos(k\omega t)\,dt;$$

$$\theta_k = tg^{-1}(u_{ky}/u_{kx}); \quad T = 2\pi/\omega.$$

For PLL, only the fundamental component is of concern. The fundamental component is converted to a DC component by (9):

$$\begin{cases} u(t)\cdot\cos(\omega t) = \left[u_o + \sum_{k=1}^{\infty}[u_k\sin(k\omega t + \theta_k)]\right]\cdot\cos(\omega t) = \\ \qquad \frac{u_1}{2}\sin(\theta_1) + \sum_{k=1}^{\infty}[u_{kt}\sin(k\omega t + \varphi_k)] \\ u(t)\cdot\sin(\omega t) = \left[u_o + \sum_{k=1}^{\infty}[u_k\sin(k\omega t + \theta_k)]\right]\cdot\sin(\omega t) = \\ \qquad \frac{u_1}{2}\cos(\theta_1) + \sum_{k=1}^{\infty}[u'_{kt}\sin(k\omega t + \varphi'_k)] \end{cases} \quad (11)$$

Where $u_1$ is the desired fundamental component; $\theta_1$ is the phase angle of fundamental component; $u_k$ is the kth order harmonic component; $\theta_k$ is the phase angle of the kth order harmonic component;

And then the DC component is extracted by (12)

$$\begin{cases} u_{1p} = \frac{2}{T}\int_0^T u(t)\cdot\sin(\omega t)\,dt = u_1\cdot\cos(\theta_1) \\ u_{1q} = \frac{2}{T}\int_0^T u(t)\cdot\cos(\omega t)\,dt = u_1\cdot\sin(\theta_1) \end{cases} \quad (12)$$

Based on (10)-(12), the $\theta_1$ can be derived in (13):

$$\theta_1 = \tan^{-1}(u_{1q}/u_{1p}) \quad (13)$$

Once the $\theta_1$ is extracted from u(t), it can be treated as the regulated error signal as shown in FIG. 5. The proportional integral (PI) controller can control $\theta_1$ to be zero in real time to achieve the PLL of u(t).

Experimental results are shown in FIG. 6 to verify the performance of the proposed DFT PLL method under different conditions. FIG. 6(a) shows the performance of the DFT PLL when the input signal is a square wave, which includes all-order harmonic components. With a square wave input, the output signal is the sinusoidal signal extracted from the square wave. It can be seen that the sinusoidal output signal can track the input signal within three cycles. FIG. 6(b) illustrates the performance of the DFT PLL when the input signal is a triangular wave, which includes abundant low-order harmonic components. When the input signal is a triangular wave, the output signal is the sinusoidal signal extracted from the triangular wave. In the beginning, the output signal is opposite in phase with the input signal, but the sinusoidal signal can still track the input signal within five cycles. FIGS. 6(c) and (d) show the dynamic response when the frequency of the input sinusoidal signal increases from 60 Hz to 70 Hz and decreases from 60 Hz to 50 Hz, respectively. As illustrated with reference to FIG. 6, it is obvious that the output sinusoidal signal can track the input signal within only one cycle.

As mentioned above, the output voltage of the cascaded inverter 25 dominates the power allocation between DES 15 and ES 20a, 20b because the same inductor current $i_{L1}$ flows through the cascaded inverter 25. Accordingly, a preferred dual-stage DFT PLL approach is developed to synchronize the inductor current $i_{L1}$ and extract the active and reactive components of $v_{inv}$ relative to $i_{L1}$, as shown with reference to FIG. 7. In the first stage, $v_g$, which is u(t) in FIG. 5, is used for the PLL signal. The phase angle ωt corresponding to $v_g$ is obtained and used for the synchronization of $i_{L1}$ and $v_{inv}$. In the second stage, $i_{L1}$ and $v_{inv}$ are synchronized with $v_g$ by exploiting the same approach as shown in (11)-(13). The phase angles β and δ of $i_{L1}$ and $v_{inv}$ relative to $v_g$ can be derived and then synthesize the α, which is the phase shift angle between $i_{L1}$ and $v_{inv}$. After obtaining the voltage amplitude $V_{inv}$, α and ωt, the $v_{invp}$ and $v_{invq}$, which are the components of the $v_s$ in phase with $i_{L1}$ and leading 90° to $i_{L1}$ respectively, can be obtained and matched with (8). The derived $v_{invq}$ combing with the selected k may then be used to conduct the reactive power from distributed energy sources 15 and energy storages 20a, 20b.

Figure 7:
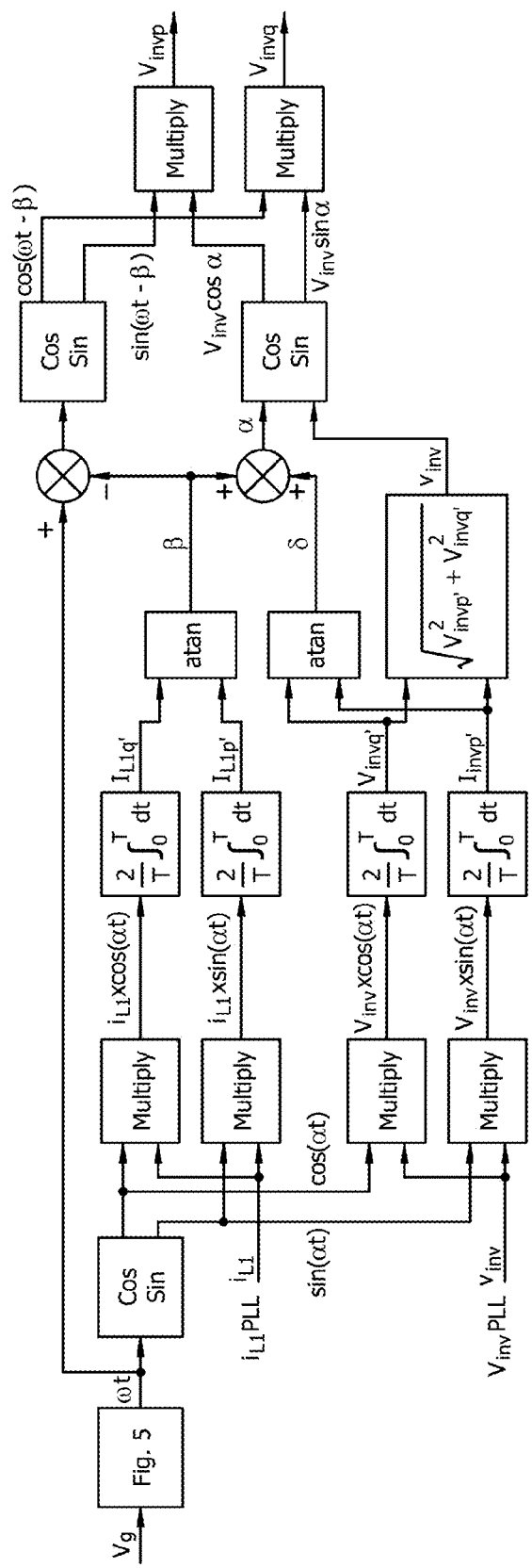
FIG. 7 illustrates the proposed dual-stage DFT PLL algorithm in accordance with an embodiment of the present invention.
Figures 8A, 8B:
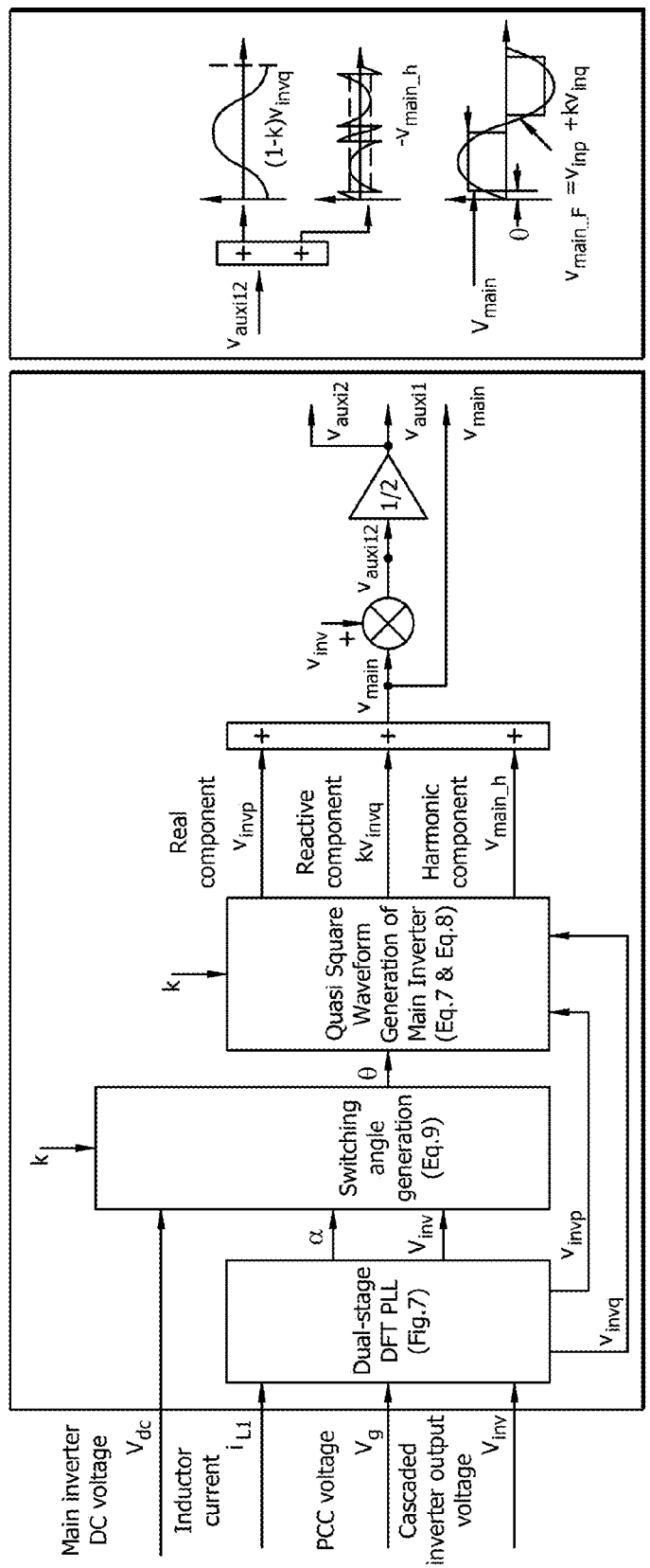
FIG. 8 illustrates the proposed Reactive Power Allocation Strategy in accordance with an embodiment of the present invention: (a) voltage reference generation for main inverter and auxiliary inverters; (b) voltage synthesis of $v_{main}$ and $v_{auxi12}$
Figure 9A:
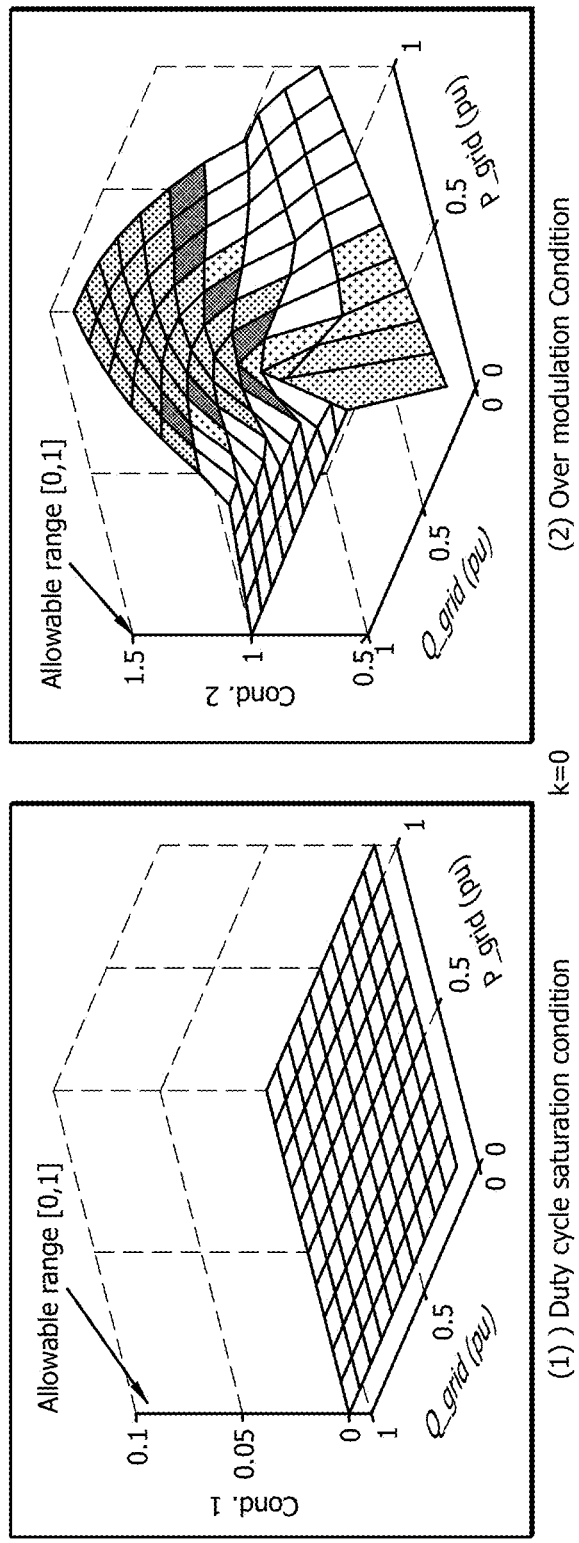
FIG. 9 illustrates the operation conditions of single-stage unit with different k when P and Q changes from 0 to 1.0 pu, in accordance with an embodiment of the present invention.
Figure 9B:
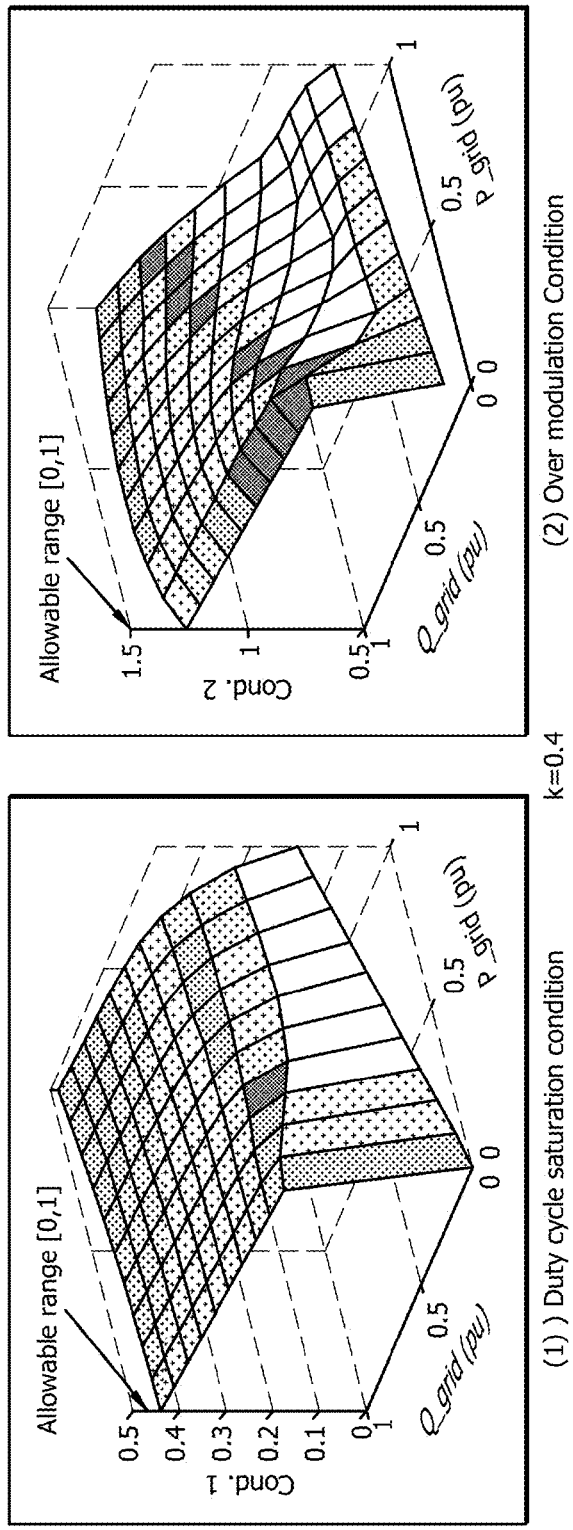
Figure 9C:
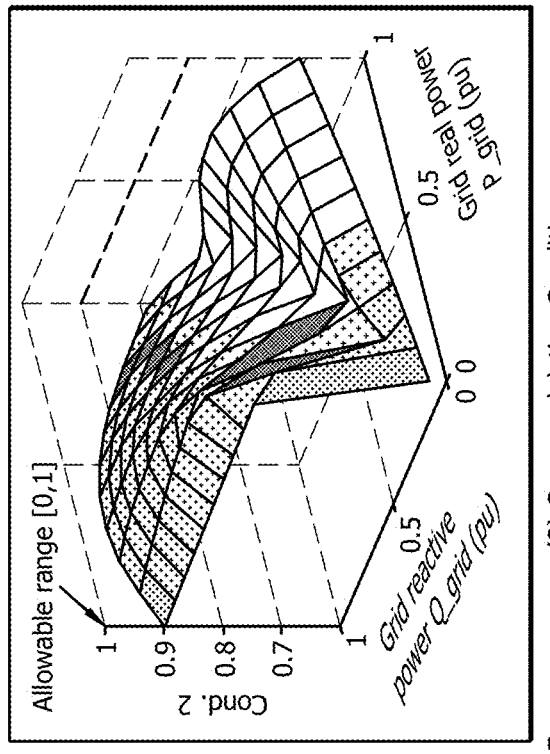
Figure 9C:
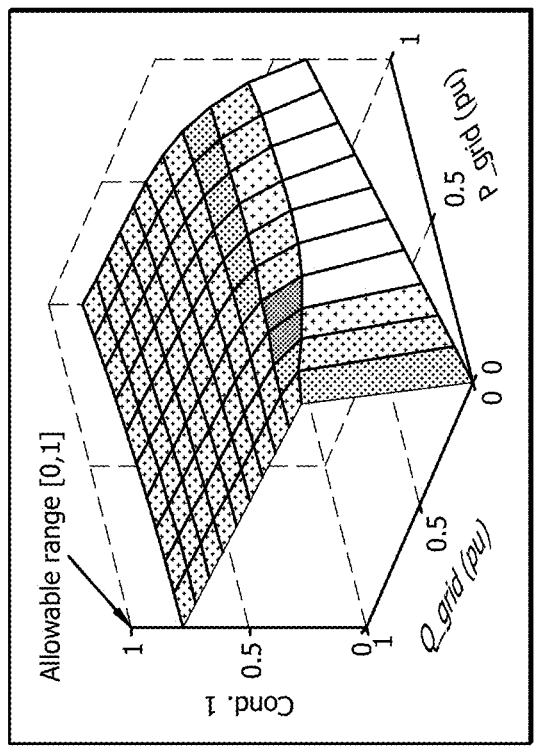
Figure 9D:
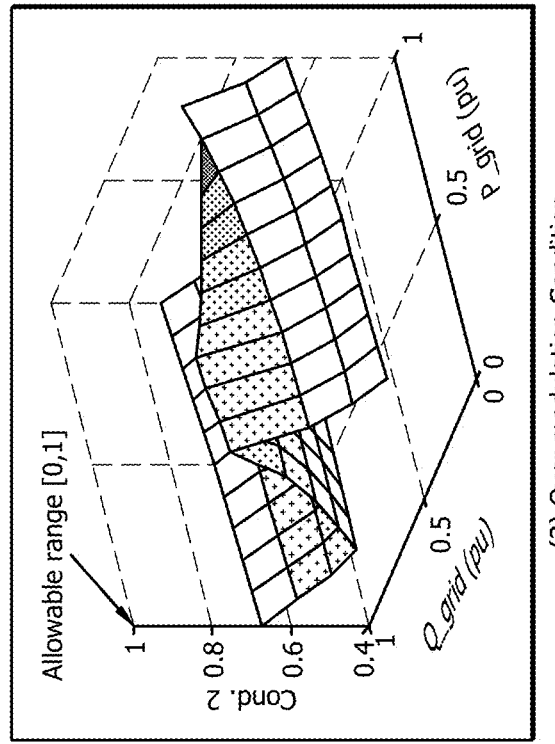
Figure 9D:
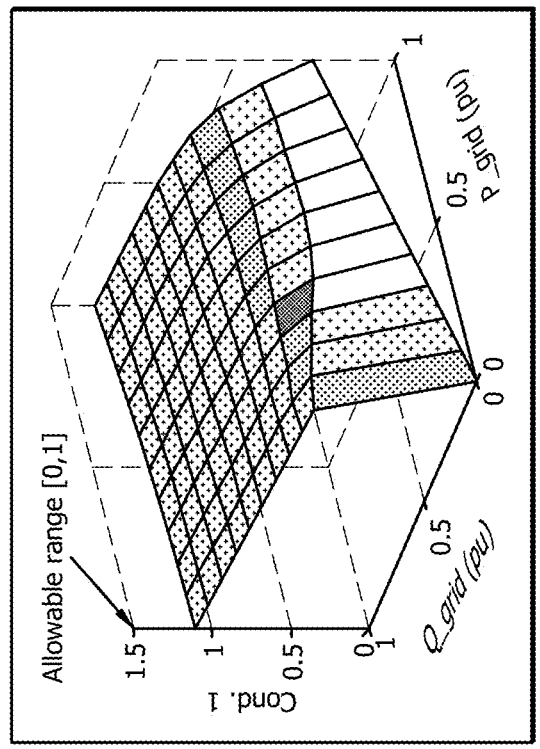

The reactive power allocation strategy with hybrid fundamental and PWM control, in accordance with the present invention, is illustrated with reference to FIG. 8. In order to effectively achieve the desired power allocation, it is vital to accurately calculate the $v_{main}$, $v_{auxi1}$ and $v_{auxi2}$. In FIG. 8(a), the $i_{L1}$ $v_g$, and $v_{inv}$ are firstly measured and sent to the "Dual-stage DFT PLL" module as shown in FIG. 7, which generates the α, $V_{inv}$, $v_{invp}$ and $v_{invq}$. The detected PV voltage $V_{dc}$, α, $V_{inv}$, and k dedicate together to generate the switching angle of main inverter θ presented in (9). After obtaining θ, the main inverter 40a outputs the quasi-square-wave voltage $v_{main}$, including real power component $v_{invp}$, reactive power component $kv_{invq}$ and harmonic component $v_{invh}$ as described in (7)-(8). The two auxiliary inverters 40b, 40c generate the voltage $v_{auxi12}$, which is separated into $v_{auxi1}$ and $v_{auxi2}$. Therefore, $v_{main}$ and $v_{auxi12}$ synthesize the desired inverter voltage $v_{inv}$. FIG. 8(b) shows the voltage synthesis of $v_{main}$ and $V_{auxi12}$. The θ indicates the relationship between $v_{main}$ and its fundamental component $v_{main\_F}=v_{invp}+kv_{invq}$. The $v_{auxi12}$ includes two components: $(1-k)v_{invq}$ and $-v_{main\_h}$. The $v_{main\_h}$ from main inverter 40a can be canceled by $-v_{main\_h}$ from auxiliary inverters 40b, 40c to improve the cascaded inverter output voltage quality. The auxiliary inverters 40b, 40c also supply the rest of the reactive power component $(1-k)v_{invq}$ of $v_{inv}$. In this way, the reactive power can be distributed between main 40a and auxiliary inverter cells 40b, 40c.

In the present invention, k decides the weighted q-axis voltage component in the main inverter cell 40a and auxiliary inverter cells 40b, 40c, and therefore determines the reactive power in each cell. k can be varied from 0~1 to generate a wide range Q_grid under a required P_grid. However, inappropriate k will cause duty cycle saturation or over modulation resulting in degraded power quality. In addition, the appropriate range of k varies with P_grid. The design guidelines for selecting k are described as follows when P_grid and Q_grid vary from 0~1 pu, respectively.

Firstly, in order to avoid the duty cycle saturation, the assigned q component of $v_{main}$, i.e., $kv_{invq}$, should be no bigger than the available maximum magnitude of the q component of $v_{main}$, which is calculated as $\sqrt{(4V_{dc}/\pi)^2-(V_{inv}\cos\alpha)^2}$. That is the fundamental switching angle θ shown in (9) should be controlled within [0, π/2]. The inequality condition in (14) is therefore derived and needs to be satisfied as the first limitation condition defined as Cond.1:

$$0 \le \frac{kV_{inv}\sin\alpha}{\sqrt{(4V_{dc}/\pi)^2-(V_{inv}\cos\alpha)^2}} \le 1 \quad (14)$$

Secondly, in order to avoid over modulation, the peak value of $v_{auxi1}+v_{auxi2}$ should be no bigger than $V_{cap1}+V_{cap2}$, as the second limitation condition defined as Cond.2, which is shown in (15).

$$\frac{\max|(1-k)V_{invq}-V_{main\_h}|}{(V_{cap1}+V_{cap2})} \le 1 \quad (15)$$

An appropriate k can be obtained based on (14-15). Four cases with different k values are shown in FIGS. 9(a-1, b-1, c-1, and d-1) which illustrates Cond.1 variation as P_grid and Q_grid varies from 0 to 1.0 pu. FIGS. 9(a-2, b-2, c-2, and d-2) illustrates Cond.2 variation with different k under a wide P_grid and Q_grid variation range. As shown in the 3D plot, when 'k'=0, 0.4 and 1, (14) and (15) can not be satisfied simultaneously. As such, the 'k'=0.7 is a proper reactive power allocation coefficient under wide real and reactive power ranges.

Figure 10A:
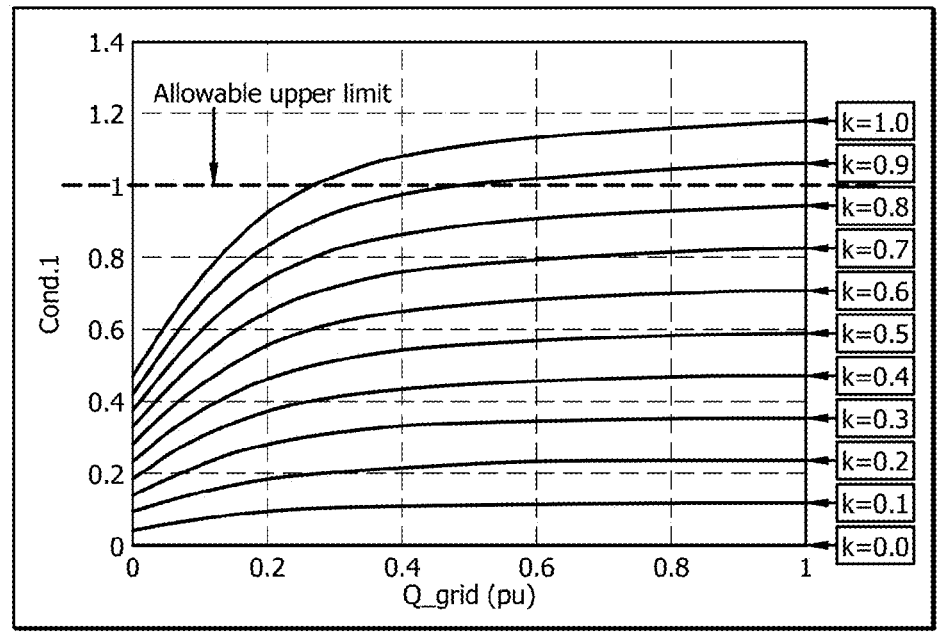
FIG. 10 illustrates the operation conditions of single-stage unit with different k when P=1.0 pu. and Q changes from 0 to 1.0 pu in accordance with an embodiment of the present invention.
Figure 10B:
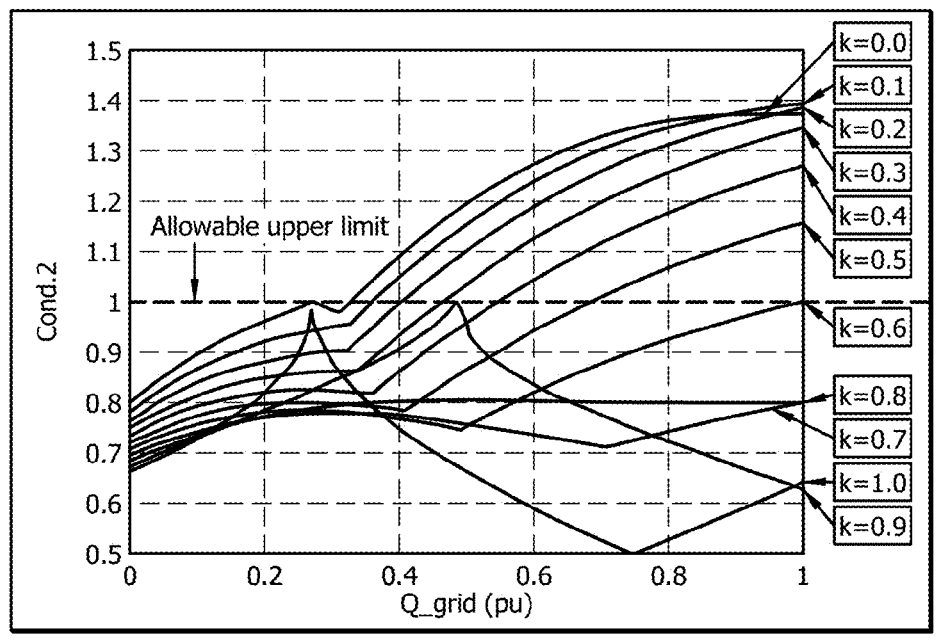

In order to verify the above analysis further, the grid real power P_grid is fixed to 1.0 pu with varied grid reactive power Q_grid and 'k' as depicted in FIG. 10. The 'k' changes from 0 to 1 by 0.1. As shown in FIG. 10(a), the allowable range of Cond.1 is in the interval [0, 1]. In this case, the reactive power allocation with 'k=0.9' and 'k=1.0' can not meet duty cycle saturation limitation condition in the whole grid reactive power. FIG. 10(b) shows the allowable range of Cond.2 is in the interval [0, 1]. If the 'k≤0.6, the over modulation limitation condition can not be satisfied in the whole grid reactive power.

Figure 11:
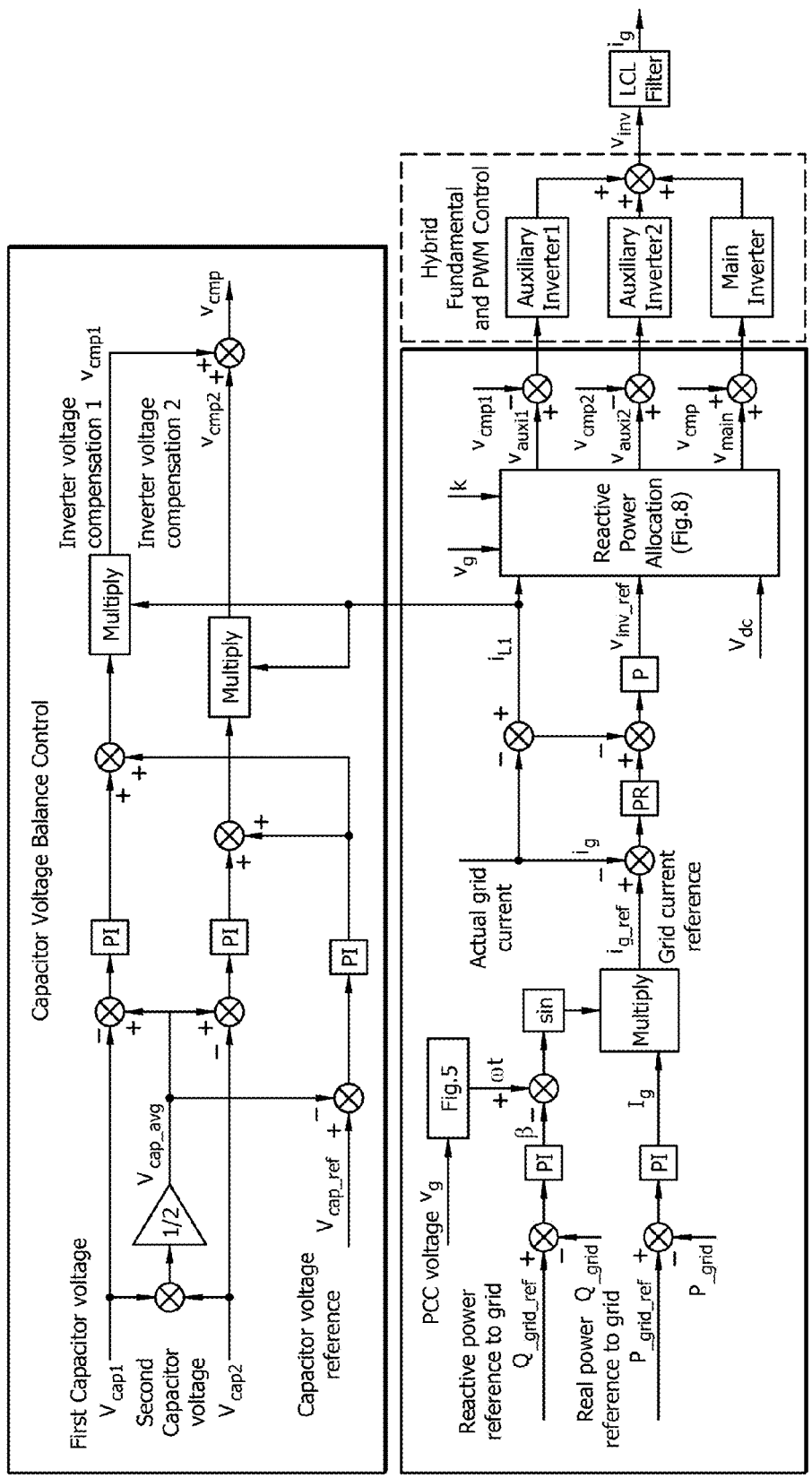
FIG. 11 illustrates the control system block for the DG system in grid-connected mode in accordance with an embodiment of the present invention.

FIG. 11 shows the control system design of proposed distributed power generation system 10 operating in grid-connected mode. The grid current reference $i_{g\_ref}$ is generated by controlling P_grid and Q_grid to track their reference. The grid current reference $i_{g\_ref}$ is generated by the 'current reference generator' module. An inner proportional (P) controller is cascaded with an outer loop proportional plus resonant (PR) controller to control the grid current $i_g$ to track $i_{g\_ref}$ with zero steady-state error. The "reactive power allocation" module as shown in FIG. 8 receives $v_{inv\_ref}$ from current controller and generates the references of $v_{main}$, $v_{auxi1}$ and $v_{auxi2}$. The "capacitor voltage balance control" module is developed to achieve two capacitor voltages, $V_{cap1}$ and $V_{cap2}$, to track the reference $V_{cap\_ref}$. The capacitor voltage balance controller receives the inductor current $i_{L1}$ and generates the inverter voltage compensation components $v_{cmp1}$ and $v_{cmp2}$. The sum $v_{cmp}=v_{cmp1}+v_{cmp2}$ is added to $v_{main}$, and sent to the hybrid fundamental and PWM control module to generate the main inverter voltage. Similarly, the $v_{auxi1}-v_{cmp1}$ and $v_{auxi2}-v_{cmp2}$ are sent to the control module respectively to generate the corresponding auxiliary inverter voltages.

Figure 12A:
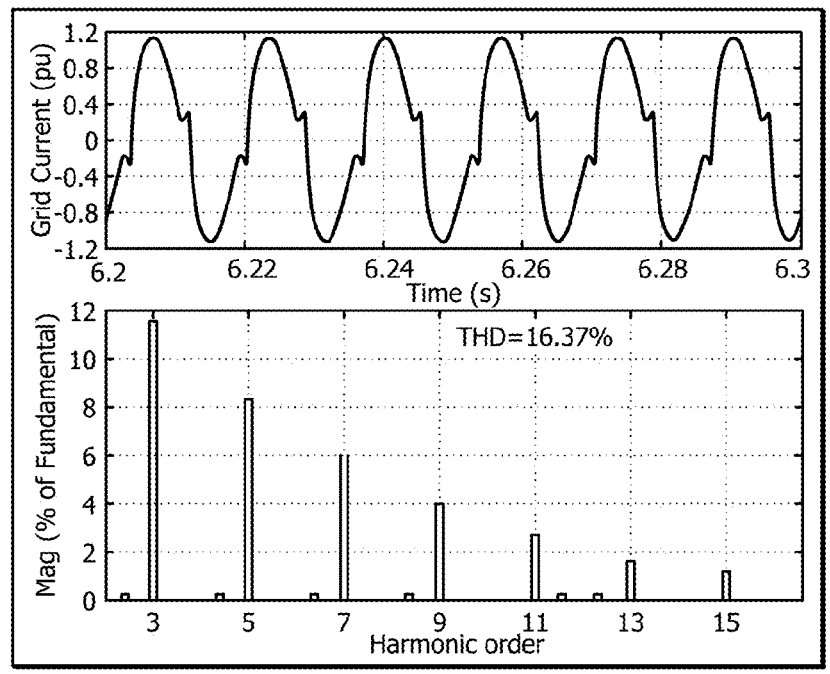
FIG. 12 illustrates the Grid current and total harmonic distortion as P_grid=0.5 pu, Q_grid=1.0 pu with different 'k', in accordance with an embodiment of the present invention.
Figure 12B:
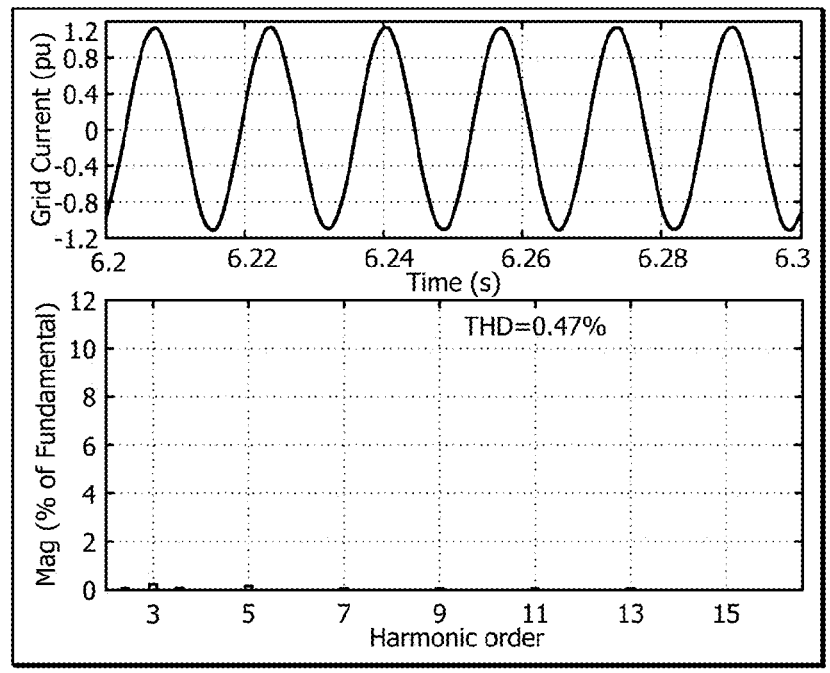

The performance of the proposed reactive power allocation (RPA) strategy is firstly tested in simulation. The system parameters are shown in Table I. In order to investigate the effect of 'k' on power quality, the grid current and its FFT results with different 'k' are compared as real and reactive power delivered to the grid are fixed to 0.5 pu and 1.0 pu, respectively in FIG. 12. As shown in FIG. 12(a), the grid current with 'k'=0.4 has a total harmonic distortion (THD) of 16.37%. However, THD can be decreased to 0.47% as 'k'=0.7 in FIG. 12(b). It is clear that 'k'=0.7 is a proper reactive power allocation coefficient.

Figure 13:
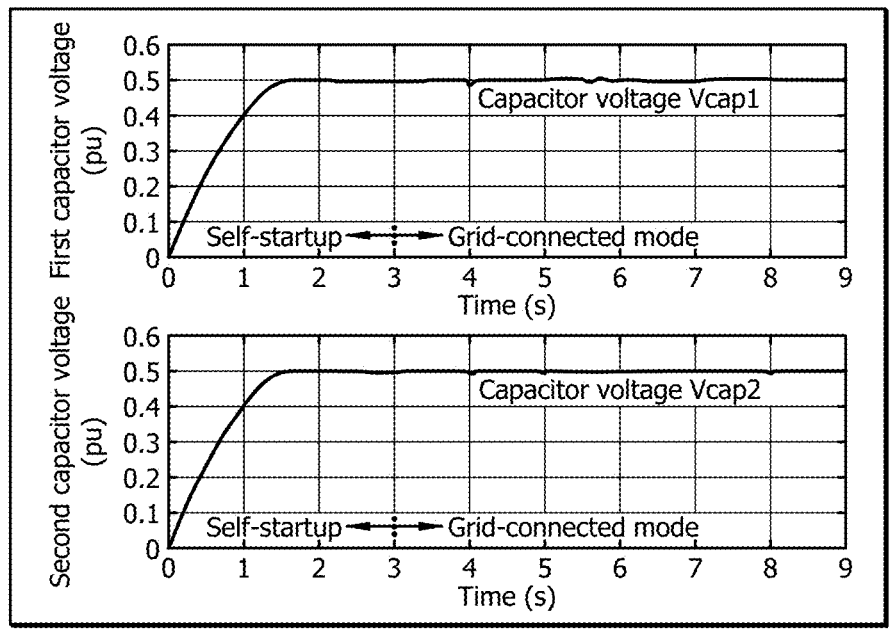
FIG. 13 illustrates the two capacitor voltages in self-startup and grid-connected mode in accordance with an embodiment of the present invention.
Figure 14:
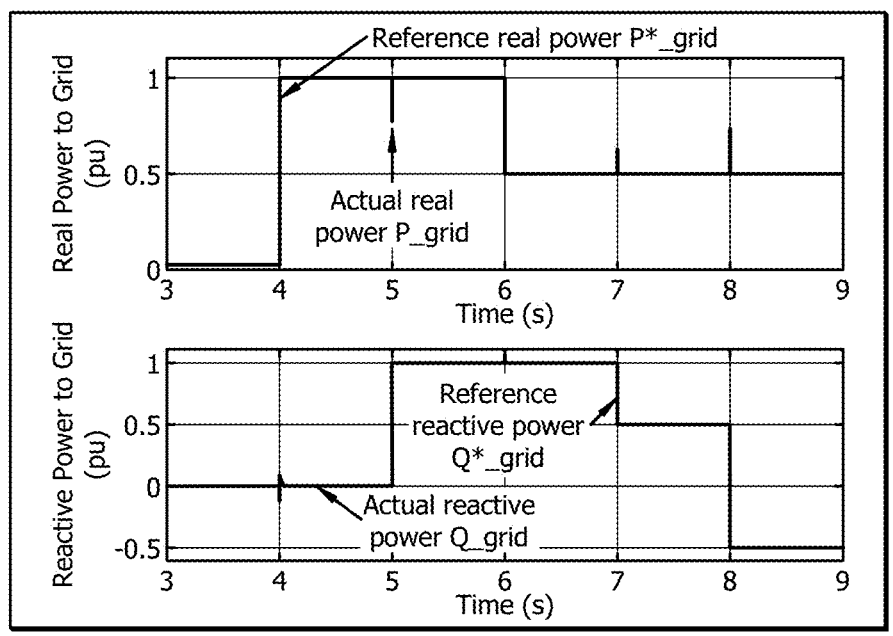
FIG. 14 illustrates the real and reactive power delivered to grid in grid-connected mode in accordance with an embodiment of the present invention.

FIG. 13-FIG. 15 show the simulation results with 'k'=0.7. FIG. 13 shows the two capacitor voltages, $V_{cmp1}$ and $V_{cmp2}$, in self-startup and grid-connected mode. Before the normal operation of the DG system, the two capacitors are charged to the 0.5 pu by self-startup. After 3 s, the DG system operates in grid-connected mode. It can be seen from FIG. 13 that the capacitors are kept approximately constant at 0.5 pu while the real and reactive power delivered to the grid varies.

FIG. 14 illustrates the dynamic response to step changes in the real power to grid reference P*_grid from 0 to 1.0 pu at 4 s and back to 0.5 pu at 6 s, reactive power to grid reference Q*_grid from 0 to 1.0 pu at 5 s and back to 0.5 pu at 7 s, and then to −0.5 pu at 8 s. It is obvious that the real and reactive power, P_grid and Q_grid, can quickly and smoothly track their references.

Figure 15A:
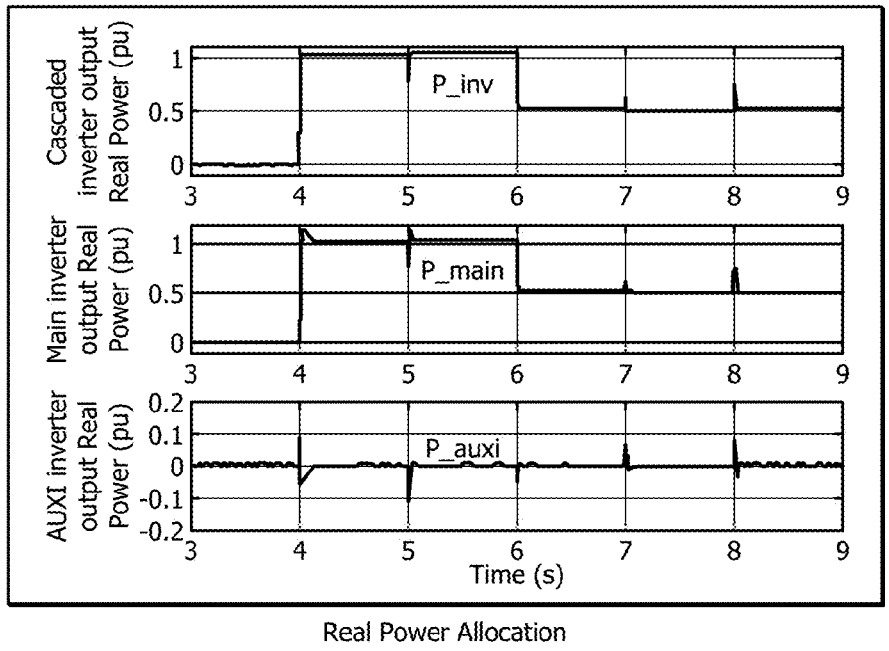
FIG. 15 illustrates the real and reactive power from cascaded inverter, main inverter and auxiliary inverter with 'k'=0.7 in accordance with an embodiment of the present invention.
Figure 15B:
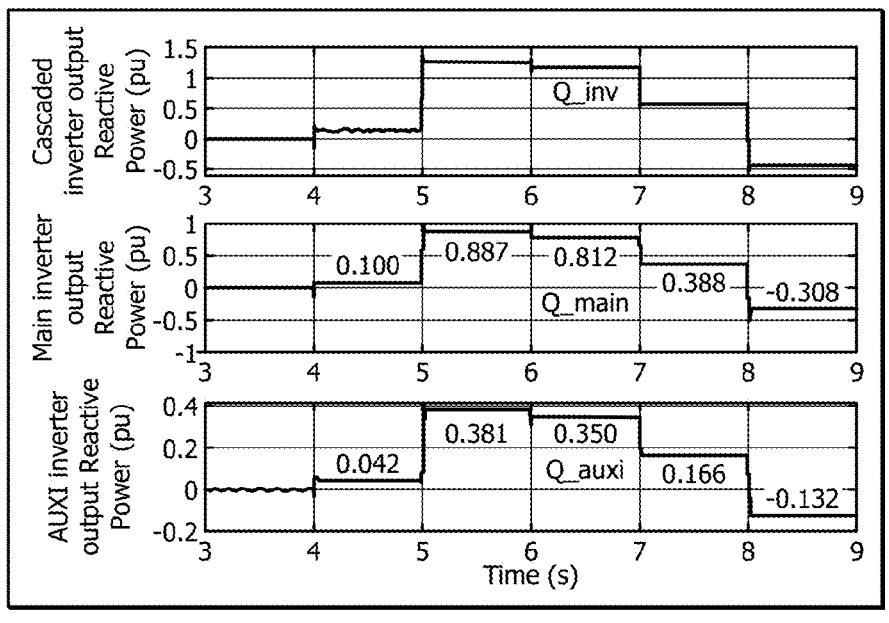

FIG. 15 depicts the real and reactive power from the cascaded inverter 25, main inverter 40a and auxiliary inverter 40b, 40c, while the P_grid and Q_grid vary. At steady-state, the real power provided by the main inverter 40a P_main is equal to the real power from the cascaded inverter 25 P_inv as shown in FIG. 15(a). The real power from auxiliary inverter 40b, 40c P_auxi changes only during power transition to keep the capacitor voltage constant. The P_inv is a bit more than P_grid due to the system loss. As shown in FIG. 15(b), the reactive power from the cascaded inverter 25 Q_inv is also more than Q_grid due to the system loss. The ratio between the reactive power from main inverter 40a Q_main and auxiliary inverters 40b, 40c Q_auxi is always 0.7 as P_grid and Q_grid vary.

Figure 16:
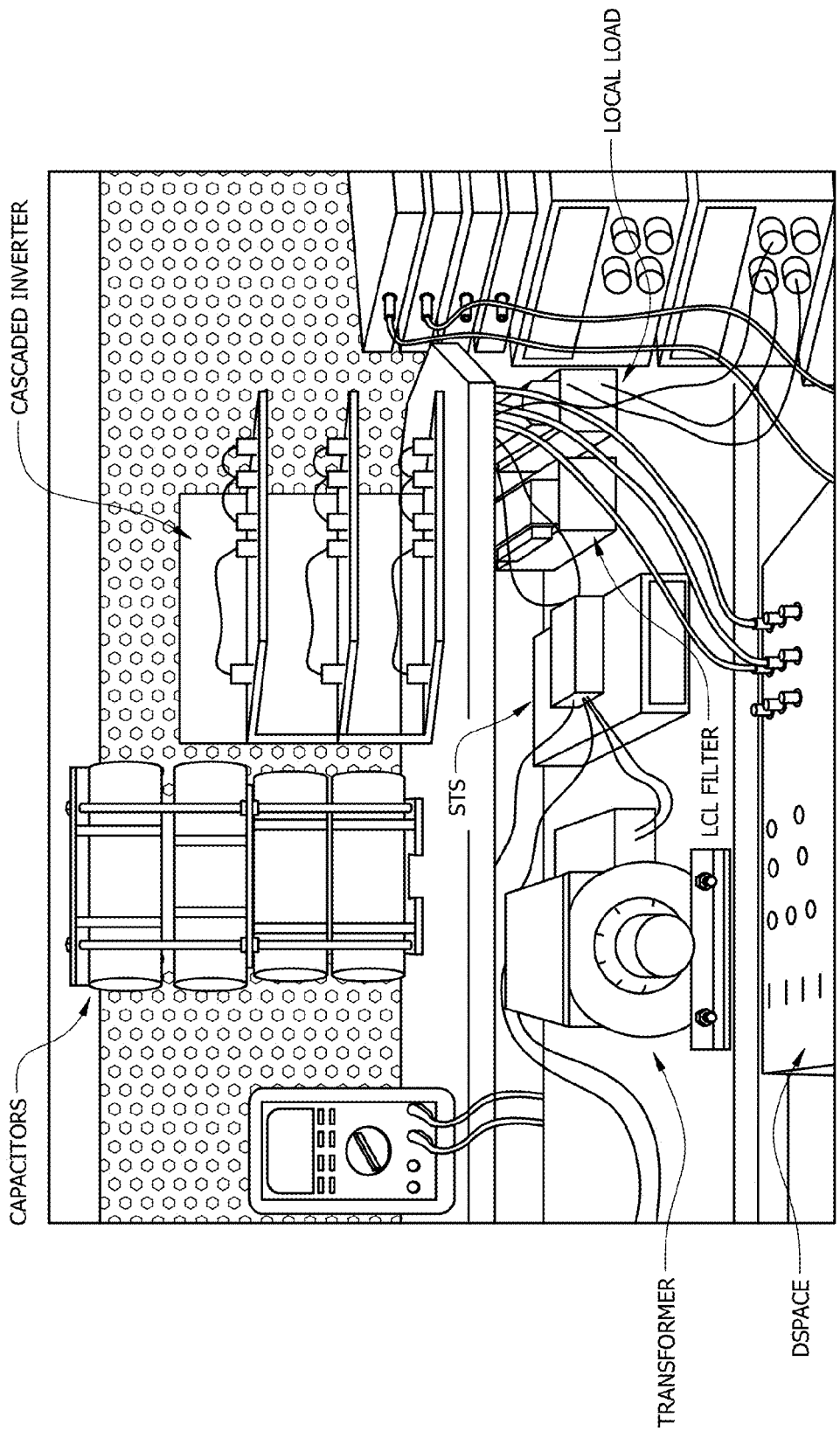
FIG. 16 illustrates the hardware prototype of the proposed system in accordance with an embodiment of the present invention.

A 3.5 kW hardware prototype has been built in the laboratory as shown in FIG. 16. In this exemplary embodiment of the present invention, the IGBT FMG2G100US60 has been chosen as the main inverter switch operating at the fundamental frequency and the MOSFET SUP85N15-21 has been used in the auxiliary inverters operating at 2.5 kHz. The control algorithms are implemented in dSPACE DS1104 controller. The experimental results at 350 W with 'k'=0.7 are presented with reference to FIG. 17 through FIG. 19.

Figure 17:
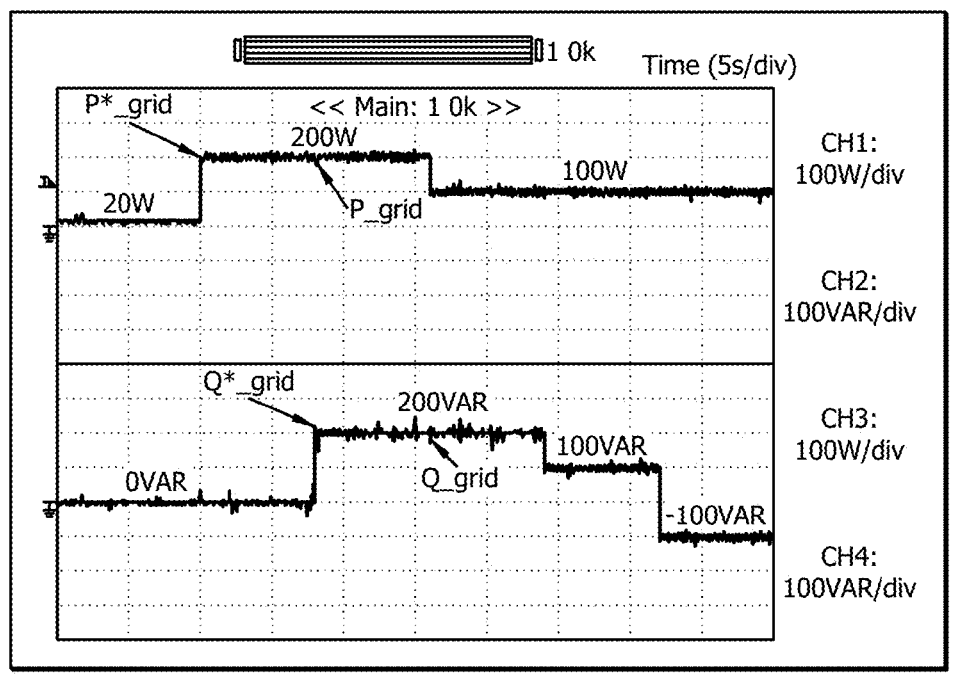
FIG. 17 illustrates the experimental results of real and reactive power delivered to grid P_grid, Q_grid, and their reference P*_grid, Q*_grid in accordance with an embodiment of the present invention.
Figure 18A:
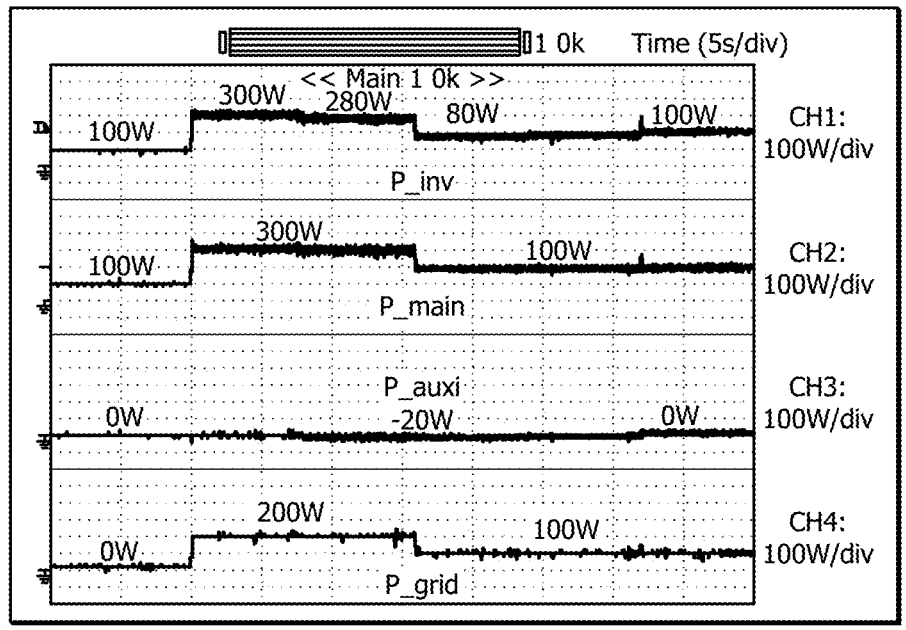
FIG. 18 illustrates the experimental results of power allocation: (a) Real power allocation of cascaded inverter, main inverter and auxiliary inverter, P_inv, P_main, P_auxi, (b) Reactive power allocation of cascaded inverter, main inverter and auxiliary inverter, Q_inv, Q_main, Q_auxi, in accordance with an embodiment of the present invention.
Figure 18B:
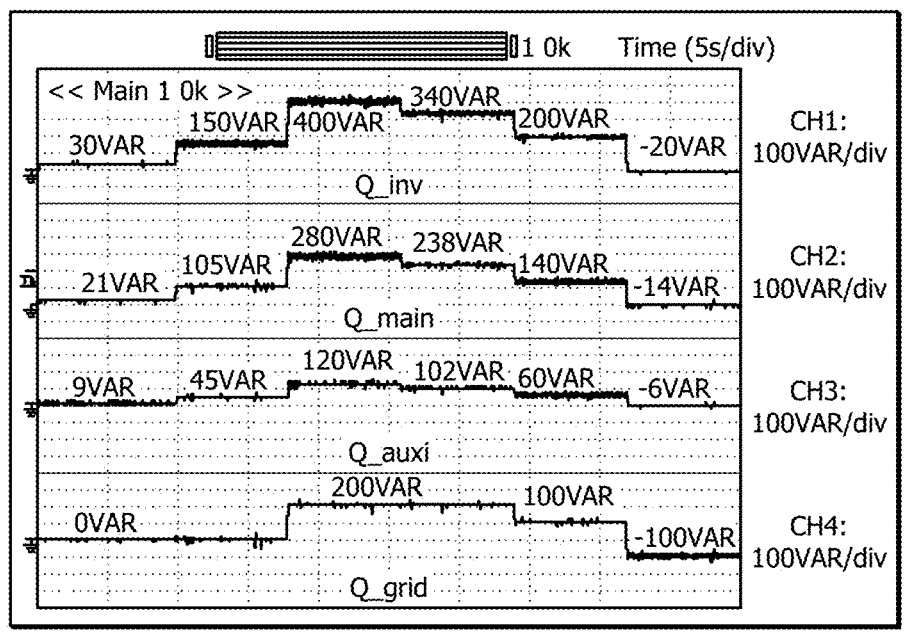
Figure 19A:
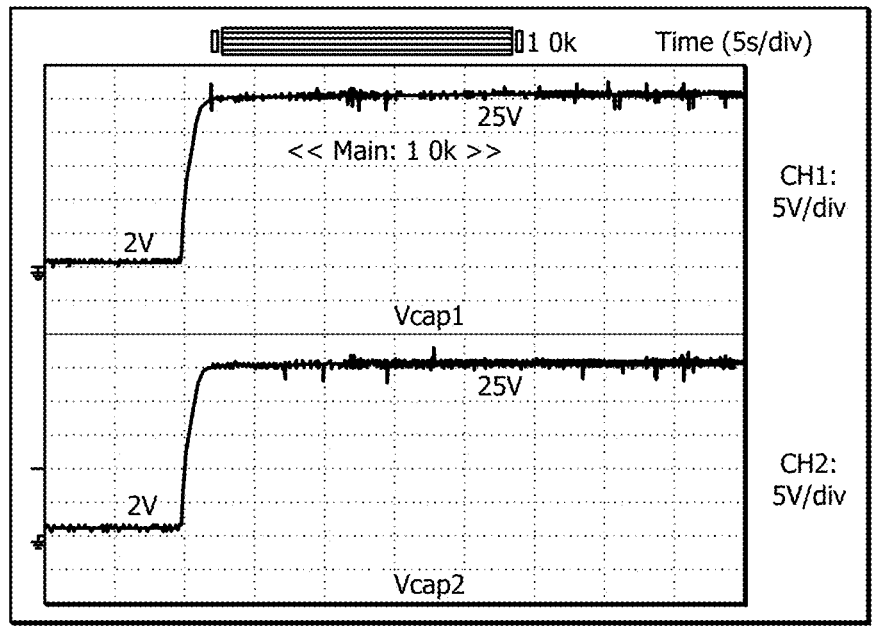
FIG. 19 illustrates the experimental results of two capacitor voltages, Vcap1 and Vcap2: (a) Self-startup; (b) Grid-connected mode, in accordance with an embodiment of the present invention.
Figure 19B:
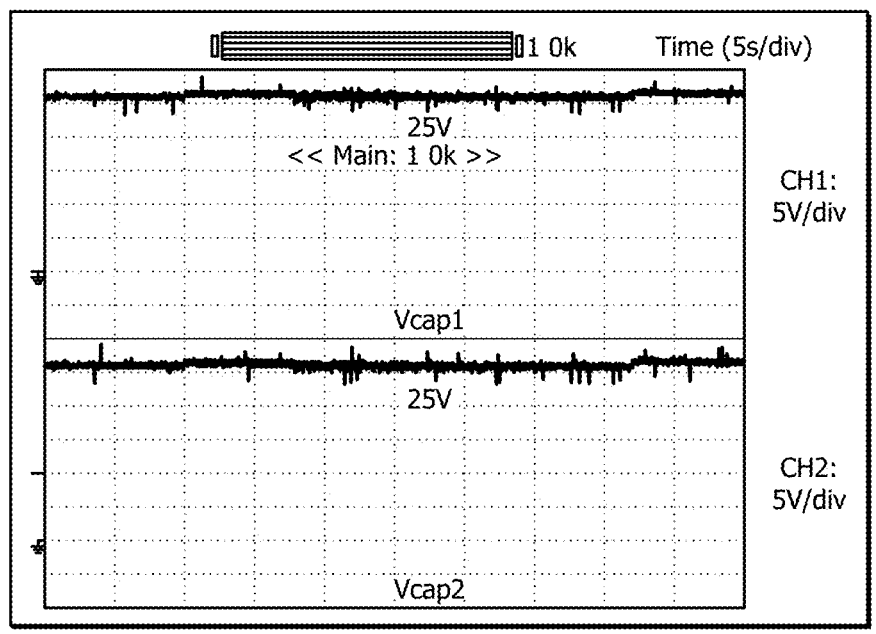

FIG. 17 shows the response of real and reactive power to the grid at step changes in grid-connected mode. P*_grid increases from 20 W to 200 W and back to 100 W. Q*_grid increases from 0 to 200 VAR and then drops to 100 VAR, finally reaches to −100 VAR. The real and reactive power distribution between the main inverter 40a and auxiliary inverters 40b, 40c is shown in FIG. 18. It can be seen from FIG. 18(a) that the P_inv is very close to P_main at steady state. P_auxi changes a small amount only to keep capacitor voltage constant. As anticipated, the ratio between Q_main and Q_auxi is maintained to be 0.7 in (b). Q_inv is more than Q_grid due to the system reactive power loss. FIG. 19(a) shows that the two capacitor voltages charge to 25V quickly during the startup process. Capacitor voltages are stabilized at 25V in grid-connected mode as the power varies as shown in FIG. 19(b).

In accordance with the present invention, a novel DFT PLL technique is developed to separate the real and reactive power between different energy sources/storages. The DFT PLL technique is immune to harmonics, signal amplitude, frequency and phase which may affect the PLL performance. The hybrid modulation technique and sophisticated power allocation strategy integrating the proposed DFT PLL method are developed to achieve wide range reactive power compensation and optimized real power distribution.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An inverter for a distributed generation system, the distributed generation system comprising at least one distributed energy source and at least one energy storage, the inverter comprising:
   a main transformerless DC to AC inverter to be coupled to the at least one distributed energy source, the main transformerless DC to AC inverter to provide a real power of the inverter and to provide a first portion of a reactive power of the inverter, wherein the main transformerless DC to AC inverter switches at a fundamental frequency; and
   at least one auxiliary transformerless DC to AC inverter in cascade with the main transformerless DC to AC inverter, wherein an output of the main transformerless DC to AC inverter is coupled to an input of the at least one auxiliary transformerless DC to AC inverter, wherein each of the at least one auxiliary transformerless DC to AC inverters to be coupled to one of each of the at least one energy storages and each of the at least one auxiliary transformerless DC to AC inverters to provide a remaining portion of the reactive power of the inverter, wherein the sum of the first portion of the reactive power from the main inverter and each of the remaining portions of the reactive power from each of the auxiliary inverters equals a total reactive power of the inverter for the distributed generation system, wherein the at least one auxiliary transformerless DC to AC inverter switches at a pulse-width-modulated frequency.

2. The inverter of claim 1, wherein the at least one main transformerless DC to AC inverter is an H-bridge cell.

3. The inverter of claim 1, wherein the at least one auxiliary transformerless DC to AC inverter is an H-bridge cell.

4. The inverter of claim 1, further comprising a reactive power allocator to allocate the first portion of the reactive power to the main inverter and to allocate the remaining portion of the reactive power to each of the auxiliary inverters.

5. The inverter of claim 4, wherein the reactive power allocator further comprises a dual-stage DFT (Discrete Fourier Transform) PLL (Phase-Lock Loop) module.

6. The inverter of claim 1, further comprising a current controller coupled to the main inverter and to each of the at least one auxiliary inverters.

7. The inverter of claim 6, further comprising a capacitor voltage balance control module coupled to the current controller.

8. An inverter for a distributed generation system, the distributed generation system comprising at least one distributed energy source and at least one energy storage, the inverter comprising:
   a main transformerless DC to AC inverter to be coupled to a distributed energy source, the main transformerless DC to AC inverter to provide a real power of the inverter and to provide a first portion of a reactive power of the inverter, wherein the main transformerless DC to AC inverter switches at a fundamental frequency; and
   a first auxiliary transformerless DC to AC inverter in cascade with the main transformerless DC to AC inverter, wherein an output of the main transformerless DC to AC inverter is coupled to an input of the first auxiliary transformerless DC to AC inverter, wherein the first auxiliary transformerless DC to AC inverter to be coupled to a first energy storage and the first auxiliary DC to AC inverter to provide a second portion of the reactive power of the inverter, wherein the first auxiliary transformerless DC to AC inverter switches at a pulse-width-modulated frequency; and
   a second auxiliary transformerless DC to AC inverter in cascade with the main DC to AC inverter and the first auxiliary transformerless DC to AC inverter, wherein an output of the first auxiliary transformerless DC to AC inverter is coupled to an input of the second auxiliary transformerless DC to AC inverter and an output of the first auxiliary transformerless DC to AC in, wherein the second auxiliary transformerless DC to AC inverter to be coupled to a second energy storage and the second auxiliary transformerless DC to AC inverter to provide a third portion of the reactive power of the inverter, wherein the sum of the first portion of the reactive power from the main transformerless inverter, the second portion of the reactive power from the first auxiliary transformerless DC to AC inverter and the third portion of the reactive power from the second auxiliary transformerless DC to AC inverter equals a total reactive power of the inverter for the distributed generation system, wherein the second auxiliary transformerless DC to AC inverter switches at a pulse-width-modulated frequency.

9. The inverter of claim 8, wherein the one main transformerless DC to AC inverter is an H-bridge cell.

10. The inverter of claim 1, wherein the first auxiliary transformerless DC to AC inverter is an H-bridge cell.

11. The inverter of claim 1, wherein the second auxiliary transformerless DC to AC inverter is an H-bridge cell.

12. A method for inverting DC to AC in a distributed generation system, the distributed generation system comprising at least one distributed energy source and at least one energy storage, the method comprising:

calculating a reactive power allocation coefficient;

providing a real power and a first portion of a reactive power from a main transformerless DC to AC inverter coupled to the at least one distributed energy source, wherein the first portion of the reactive power is dependent upon the reactive power allocation coefficient and wherein the at least one main transformerless DC to AC inverter switches at a fundamental frequency; and providing a remaining portion of the reactive power from each of at least one auxiliary transformerless DC to AC inverters coupled in cascade to the main transformerless DC to AC inverter and coupled to each of the at least one energy storages, wherein an output of the main transformerless DC to AC inverter is coupled to an input of the at least one auxiliary transformerless DC to AC inverter, wherein the remaining portion of the reactive power is dependent upon the reactive power allocation coefficient and wherein the sum of the first portion of the reactive power from the main transformerless DC to AC inverter and the remaining portion of the reactive power from each of the auxiliary transformerless DC to AC inverters equals a total reactive power of the inverter and wherein the at least one auxiliary transformerless DC to AC inverter switches at a pulse-width-modulated frequency.

13. The method of claim 12, wherein the main transformerless DC to AC inverter is a H-bridge cell.

14. The method of claim 12, wherein the at least one auxiliary transformerless DC to AC inverter is an H-bridge cell.

15. The method of claim 12, wherein calculating a reactive power allocation coefficient further comprises calculating a reactive power allocation coefficient using a dual-stage DFT (Discrete Fourier Transform) PLL (Phase-Lock Loop) module to synthesize an output voltage from the main inverter and from each of the auxiliary inverters using an AC current.

\* \* \* \* \*